US012812221B2

(12) United States Patent
Katsumata et al.

(10) Patent No.: US 12,812,221 B2
(45) Date of Patent: Nov. 24, 2026

(54) INFORMATION PROCESSING APPARATUS, INFORMATION PROCESSING METHOD, REPRODUCTION PROCESSING APPARATUS, AND REPRODUCTION PROCESSING METHOD

(71) Applicant: Sony Group Corporation, Tokyo (JP)

(72) Inventors: Mitsuru Katsumata, Tokyo (JP); Ryohei Takahashi, Tokyo (JP); Mitsuhiro Hirabayashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 19/309,640

(22) Filed: Aug. 26, 2025

(65) Prior Publication Data

US 2025/0380037 A1 Dec. 11, 2025

Related U.S. Application Data

(63) Continuation of application No. 17/617,014, filed as application No. PCT/JP2020/014884 on Mar. 31, 2020, now abandoned.

(Continued)

(51) Int. Cl.

*H04N 21/84* (2011.01)
*H04N 21/81* (2011.01)
*H04N 21/854* (2011.01)

(52) U.S. Cl.

CPC .......... *H04N 21/84* (2013.01); *H04N 21/816* (2013.01); *H04N 21/85406* (2013.01)

(58) Field of Classification Search

CPC ................ H04N 21/84; H04N 21/816; H04N 21/85406; H04N 21/23412;

(Continued)

(56) References Cited

U.S. PATENT DOCUMENTS 6,665,318 B1 * 12/2003 Tomokane ............ H04L 65/613 370/542
6,895,555 B1 * 5/2005 Ando ................ H04N 21/4542 715/848

(Continued)

FOREIGN PATENT DOCUMENTS

CN 106464943 A 2/2017
CN 107292965 A 10/2017

(Continued)

OTHER PUBLICATIONS

Zhu Li et al, "A Fast Rendering Method for 3D City Building Point Cloud Models", Journal of Computer Aided Design & Computer Graphics, vol. 27 No. 8, Aug. 2015.

(Continued)

*Primary Examiner* — Helen Shibru
(74) *Attorney, Agent, or Firm* — XSENSUS LLP

(57) ABSTRACT

Provided are an information processing apparatus, a reproduction processing apparatus, an information processing method, and a reproduction processing method that enable a client device to efficiently select a content configuration. A preprocessing unit generates content configuration selection information, with respect to one or a plurality of contents, for determining whether or not each of the contents is reproducible, each of the contents having a content configuration including one or more three-dimensional objects and space arrangement information therefor to represent a virtual space. A file generation unit generates a file including data about the virtual space and the content configuration selection information.

14 Claims, 22 Drawing Sheets

Related U.S. Application Data

(60) Provisional application No. 62/866,430, filed on Jun. 25, 2019.

(58) Field of Classification Search
CPC ......... H04N 21/23439; H04N 21/2362; H04N 21/4345; H04N 21/4347; H04N 21/44209; H04N 21/4621; H04N 21/8456; H04N 21/8146
USPC .......................................................... 386/239
See application file for complete search history.

(56) References Cited

U.S. PATENT DOCUMENTS

| | | | |
|---|---|---|---|
| 6,952,451 B2 * | 10/2005 | Okada .................. | H04N 19/176 375/E7.145 |
| 7,532,217 B2 | 5/2009 | Marrin et al. | |
| 8,497,858 B2 | 7/2013 | Jung et al. | |
| 8,824,861 B2 | 9/2014 | Gentile et al. | |
| 9,035,942 B2 | 5/2015 | Jung et al. | |
| 9,342,864 B2 | 5/2016 | Giambalvo et al. | |
| 9,641,897 B2 | 5/2017 | Haskell et al. | |
| 10,924,875 B2 | 2/2021 | Settel | |
| 11,356,648 B2 | 6/2022 | Sakai | |
| 11,488,633 B2 | 11/2022 | Hamada et al. | |
| 11,606,576 B2 | 3/2023 | Yip et al. | |
| 11,967,153 B2 | 4/2024 | Katsumata et al. | |
| 12,160,608 B2 * | 12/2024 | Takahashi ................. | G06T 9/40 |
| 12,177,480 B2 | 12/2024 | Takahashi et al. | |
| 12,243,180 B2 | 3/2025 | Kiyama et al. | |
| 12,284,326 B2 | 4/2025 | Otsuka et al. | |
| 12,301,921 B2 | 5/2025 | Francisco | |
| 2003/0001948 A1 * | 1/2003 | Mochizuki ..... | H04N 21/234318 348/E7.071 |
| 2008/0019398 A1 | 1/2008 | Genossar et al. | |
| 2009/0027381 A1 | 1/2009 | Lee | |
| 2014/0168218 A1 | 6/2014 | Mitrea et al. | |
| 2015/0189367 A1 | 7/2015 | Schindler et al. | |
| 2015/0237418 A1 | 8/2015 | Schindler et al. | |
| 2015/0363977 A1 | 12/2015 | Chui et al. | |
| 2016/0171743 A1 | 6/2016 | Urbach | |
| 2019/0007709 A1 * | 1/2019 | Oh ..................... | H04N 21/4348 |
| 2019/0014358 A1 | 1/2019 | Takabayashi et al. | |
| 2019/0114830 A1 | 4/2019 | Bouazizi et al. | |
| 2020/0228775 A1 | 7/2020 | Sakai | |
| 2022/0406062 A1 | 12/2022 | Katsumata et al. | |
| 2023/0300374 A1 | 9/2023 | Kiyama et al. | |

FOREIGN PATENT DOCUMENTS

| | | |
|---|---|---|
| CN | 107801083 A | 3/2018 |
| JP | 2007158591 A | 6/2007 |
| JP | 2015111897 A | 6/2015 |
| JP | 6316387 B2 | 4/2018 |
| JP | 2021527391 | 3/2020 |
| JP | 7544048 B2 | 9/2024 |
| WO | 2019/064853 A1 | 4/2019 |

OTHER PUBLICATIONS

Qiu Wei. "Development and Application of 3D Model Interaction Design System Based on Java3D", Microelectronics & Computer, vol. 25 No. 11, Nov. 5, 2008.

International Search Report and Written Opinion mailed on Jun. 23, 2020, received for PCT Application PCT/JP2020/014884, Filed on Mar. 31, 2020, 9 pages including English Translation.

ISO/IEC14496-11, "Part 11:Scene description and application engine", Information technology—Coding of audio-visual objects, May 29, 2015, 562 pages.

* cited by examiner

FIG.5

```
Switch{
        exposedField      MFNode      Choice                  []
        exposedField      SFInt32     whichChoice             -1
        field             MFInt32     Points                  []
        field             MFInt32     VertivesParFace         []
        field             MFInt32     Faces                   []
        field             MFInt32     Indices                 []
        field             MFInt32     Num3DmodeData           []
        field             MFString    3DmodeDataMimeType      []
        field             MFString    3DmodeDataCodec         []
        field             MFInt32     Bitrate                 []
}
```

FIG.10

```
aligned(8)        class              SelectContentStructMetadata() {
  unsigned    int   (32)    num_contentStruct       //NUMBER OF CONTENT CONFIGURATIONS INCLUDED
    for{k=0; k< num_contentStruct; k++){            //IN CONTENT CONFIGURATION ORDER INDICATED BY Switch NODE OF SCENE DESCRIPTION DATA
      unsigned  int  (32)    Points;                 //NUMBER OF Points OF POINT CLOUD
      unsigned  int  (32)    VertivesParFace;        //NUMBER OF VERTICES OF FACE OF MESH
      unsigned  int  (32)    Faces;                  //NUMBER OF FACES OF MESH
      unsigned  int  (32)    Indices;                //NUMBER OF VERTICES OF MESH
      unsigned  int  (32)    Num3DModelData;         //NUMBER OF EXTERNALLY REFERRED-TO THREE-DIMENSIONAL MODEL DATA
      string    3DmodelDataMimeType;                 //MimeType OF EXTERNALLY REFERRED-TO THREE-DIMENSIONAL MODEL DATA
      string    3DmodelDataCodec;                    //CODEC OF EXTERNALLY REFERRED-TO THREE-DIMENSIONAL MODEL DATA
      unsigned  int  (32)    Bitrate;                //BIT RATE INCLUDING EXTERNALLY REFERRED-TO THREE-DIMENSIONAL MODEL DATA
    }
}

aligned (8)  class  6DoFContentStructBox()   extends  Box ('6dcs'){
    SelectContentStructMetadata () ;
}
```

FIG.11

| id | LIMITATIONS (ITEMS) | LIMITED ITEM (VALUE) |
|---|---|---|
| 01 | MAXIMUM Point OF POINT CLOUD (points) | 1000 |
| | MAXIMUM NUMBER OF VERTICES OF FACE OF MESH (vertices/face) | 3 |
| | MAXIMUM NUMBER OF FACES OF MESH (faces) | 300 |
| | MAXIMUM NUMBER OF VERTICES OF MESH (indices) | 900 |
| | NUMBER OF THREE-DIMENSIONAL MODEL DATA | 1000 |
| | FORMAT/CODEC INFORMATION FOR THREE-DIMENSIONAL MODEL DATA | DESIGNATED BY mime-type AND codes |
| | INFORMATION ABOUT MAXIMUM BIT RATE INCLUDING SCENE DESCRIPTION AND THREE-DIMENSIONAL MODEL DATA REFERRED TO THEREBY | 50 |
| 02 | MAXIMUM Point OF POINT CLOUD (points) | 3000 |
| | MAXIMUM NUMBER OF VERTICES OF FACE OF MESH (vertices/face) | 3 |
| | MAXIMUM NUMBER OF FACES OF MESH (faces) | 9000 |
| | MAXIMUM NUMBER OF VERTICES OF MESH (indices) | 27000 |
| | NUMBER OF THREE-DIMENSIONAL MODEL DATA | 3 |
| | FORMAT/CODEC INFORMATION FOR THREE-DIMENSIONAL MODEL DATA | DESIGNATED BY mime-type AND codes |
| | INFORMATION ABOUT MAXIMUM BIT RATE INCLUDING SCENE DESCRIPTION AND THREE-DIMENSIONAL MODEL DATA REFERRED TO THEREBY | 150 |
| 03 | MAXIMUM Point OF POINT CLOUD (points) | 10000 |
| | MAXIMUM NUMBER OF VERTICES OF FACE OF MESH (vertices/face) | 3 |
| | MAXIMUM NUMBER OF FACES OF MESH (faces) | 3000 |
| | MAXIMUM NUMBER OF VERTICES OF MESH (indices) | 9000 |
| | NUMBER OF THREE-DIMENSIONAL MODEL DATA | 10 |
| | FORMAT/CODEC INFORMATION FOR THREE-DIMENSIONAL MODEL DATA | DESIGNATED BY mime-type AND codes |
| | INFORMATION ABOUT MAXIMUM BIT RATE INCLUDING SCENE DESCRIPTION AND THREE-DIMENSIONAL MODEL DATA REFERRED TO THEREBY | 500 |

FIG.14

```
RequiedPerformance{
        field       SFInt32     Points
        field       SFInt32     VertivesParFace
        field       SFInt32     Faces
        field       SFInt32     Indices
        field       SFInt32     Num3DmodeData
        field       SFString    3DmodeDataMimeType
        field       SFString    3DmodeDataCodec
        field       sFInt32     Bitrate
}
```

FIG.15

```
<SupplementalProperty  schemeLdUri="6DoFContentStruct">
   <CSC  VertivesParFace="3"  Faces="1000"  Indices="3000"  Num3DmodelData="1"
        3DmodelDataMimeType="video/mp4"  3DmodelDataCodec="vpcc"  Bitrate="10000000"/>
   <CSC  VertivesParFace="3"  Faces="3000"  Indices="9000"  Num3DmodelData="3"
        3DmodelDataMimeType="video/mp4"  3DmodelDataCodec="vpcc"  Bitrate="30000000"/>

</SupplementalProperty>
```

FIG.16

| Elements and attributes for CSC descriptor | @Use | Description |
|---|---|---|
| CSC | 1..255 | capability FOR CONTENT CONFIGURATION IS INDICATED. IN CASE WHERE A PLURALITY OF elements APPEAR, ORDER CONFORMS TO NODE ORDER (CONTENT CONFIGURATION ORDER) IN choice field OF Switch NODE OF SCENE DESCRIPTION. |
| CSC@points | Optional | NUMBER OF Points OF POINT CLOUD |
| CSC@VetrivesParFace | Optional | NUMBER OF VERTICES OF FACE OF MESH |
| CSC@Faces | Optional | NUMBER OF FACES OF MESH |
| CSC@Indices | Optional | NUMBER OF VERTICES OF MESH |
| CSC@Num3DmodelData | Optional | NUMBER OF EXTERNALLY REFERRED-TO THREE-DIMENSIONAL MODEL DATA |
| CSC@3DmodelDataMimeType | Optional | MimeType OF EXTERNALLY REFERRED-TO THREE-DIMENSIONAL MODEL DATA |
| CSC@3DmodelDataCodec | Optional | CODEC OF EXTERNALLY REFERRED-TO THREE-DIMENSIONAL MODEL DATA |
| CSC@Bitrate | Optional | BIT RATE INCLUDING EXTERNALLY REFERRED-TO THREE-DIMENSIONAL MODEL DATA |

FIG.18

```
Switch{
        exposedField    MFNode      Choice                  []
        exposedField    SFInt32     whichChoice             -1
        field           MFInt32     MaxPoints               []
        field           MFInt32     MinPoints               []
        field           MFInt32     MaxVertivesParFace      []
        field           MFInt32     MinVertivesParFace      []
        field           MFInt32     MaxFaces                []
        field           MFInt32     MinFaces                []
        field           MFInt32     MaxIndices              []
        field           MFInt32     MinIndices              []
        field           MFInt32     MaxNum3DmodeData        []
        field           MFInt32     MinNum3DmodeData        []
        field           MFString    3DmodeDataMimeType      []
        field           MFString    Max3DmodeDataCodec      []
        field           MFString    Min3DmodeDataCodec      []
        field           MFInt32     MaxBitrate              []
        field           MFInt32     MinBitrate              []
}
```

FIG.19

```
aligned(8)    class    SelectContentStructMetadata() {
  unsigned    int   (32)    num_contentStruct           //NUMBER OF CONTENT CONFIGURATIONS INCLUDED
    for(k=0; k< num_contentStruct; k++){                //IN CONTENT CONFIGURATION ORDER INDICATED BY Switch NODE OF SCENE DESCRIPTION DATA
      unsigned  int  (32)    MaxPoints;                 //MAXIMUM NUMBER OF Points OF POINT CLOUD
      unsigned  int  (32)    MinPoints;                 //MINIMUM NUMBER OF Points OF POINT CLOUD
      unsigned  int  (32)    MaxVertivesParFace;        //MAXIMUM NUMBER OF VERTICES OF FACE OF MESH
      unsigned  int  (32)    MinVertivesParFace;        //MINIMUM NUMBER OF VERTICES OF FACE OF MESH
      unsigned  int  (32)    MaxFaces;                  //MAXIMUM NUMBER OF FACES OF MESH
      unsigned  int  (32)    MinFaces;                  //MINIMUM NUMBER OF FACES OF MESH
      unsigned  int  (32)    MaxIndices;                //MAXIMUM NUMBER OF VERTICES OF MESH
      unsigned  int  (32)    MinIndices;                //MAXIMUM NUMBER OF VERTICES OF MESH
      unsigned  int  (32)    MaxNum3DModelData;  //MAXIMUM NUMBER OF EXTERNALLY REFERRED-TO THREE-DIMENSIONAL MODEL DATA
      unsigned  int  (32)    MinNum3DModelData;  //MINIMUM NUMBER OF EXTERNALLY REFERRED-TO THREE-DIMENSIONAL MODEL DATA
      string    3DmodelDataMimeType;             //MimeType OF EXTERNALLY REFERRED-TO THREE-DIMENSIONAL MODEL DATA
      string    Max3DmodelDataCodec;             //MAXIMUM CODEC OF EXTERNALLY REFERRED-TO THREE-DIMENSIONAL MODEL DATA
      string    Min3DmodelDataCodec;             //MINIMUM CODEC OF EXTERNALLY REFERRED-TO THREE-DIMENSIONAL MODEL DATA
      unsigned  int  (32)    MaxBitrate;                //MAXIMUM BIT RATE INCLUDING EXTERNALLY REFERRED-TO THREE-DIMENSIONAL MODEL DATA
      unsigned  int  (32)    MaxBitrate;                //MINIMUM BIT RATE INCLUDING EXTERNALLY REFERRED-TO THREE-DIMENSIONAL MODEL DATA
    }
}

aligned (8)  class  6DoFContentStructBox()    extends  Box ('6dcs'){
      SelectContentStructMetadata () ;
}
```

FIG.20

| Elements and attributes for CSC descriptor | @Use | Description |
|---|---|---|
| CSC | 1..255 | capability FOR CONTENT CONFIGURATION IS INDICATED. IN CASE WHERE A PLURALITY OF elements APPEAR, ORDER CONFORMS TO NODE ORDER (CONTENT CONFIGURATION ORDER) IN choice fiedl OF Switch NODE OF SCENE DESCRIPTION. |
| CSC@Maxpoints | Optional | MAXIMUM NUMBER OF Points OF POINT CLOUD |
| CSC@Minpoints | Optional | MINIMUM NUMBER OF Points OF POINT CLOUD |
| CSC@MaxVetrivesParFace | Optional | MAXIMUM NUMBER OF VERTICES OF FACE OF MESH |
| CSC@MinVetrivesParFace | Optional | MINIMUM NUMBER OF VERTICES OF FACE OF MESH |
| CSC@MaxFaces | Optional | MAXIMUM NUMBER OF FACES OF MESH |
| CSC@MinFaces | Optional | MINIMUM NUMBER OF FACES OF MESH |
| CSC@MaxIndices | Optional | MAXIMUM NUMBER OF VERTICES OF MESH |
| CSC@MinIndices | Optional | MINIMUM NUMBER OF VERTICES OF MESH |
| CSC@MaxNum3DmodelData | Optional | MAXIMUM NUMBER OF EXTERNALLY REFERRED-TO THREE-DIMENSIONAL MODEL DATA |
| CSC@MinNum3DmodelData | Optional | MINIMUM NUMBER OF EXTERNALLY REFERRED-TO THREE-DIMENSIONAL MODEL DATA |
| CSC@3DmodelDataMimeType | Optional | MimeType OF EXTERNALLY REFERRED-TO THREE-DIMENSIONAL MODEL DATA |
| CSC@Max3DmodelDataCodec | Optional | MAXIMUM CODEC OF EXTERNALLY REFERRED-TO THREE-DIMENSIONAL MODEL DATA |
| CSC@Min3DmodelDataCodec | Optional | MINIMUM CODEC OF EXTERNALLY REFERRED-TO THREE-DIMENSIONAL MODEL DATA |
| CSC@MaxBitrate | Optional | MAXIMUM BIT RATE INCLUDING EXTERNALLY REFERRED-TO THREE-DIMENSIONAL MODEL DATA |
| CSC@MinBitrate | Optional | MINIMUM BIT RATE INCLUDING EXTERNALLY REFERRED-TO THREE-DIMENSIONAL MODEL DATA |

INFORMATION PROCESSING APPARATUS, INFORMATION PROCESSING METHOD, REPRODUCTION PROCESSING APPARATUS, AND REPRODUCTION PROCESSING METHOD

CROSS-REFERENCE TO RELATED APPLICATIONS

The present application is a continuation of U.S. application Ser. No. 17/617,014, filed Dec. 7, 2021, which is based on PCT filing PCT/JP2020/014884, filed Mar. 31, 2020, which claims priority to U.S. Provisional Application No. 62/866,430, filed Jun. 25, 2019, the entire contents of each are incorporated herein by reference.

FIELD

The present invention relates to an information processing apparatus, an information processing method, a reproduction processing apparatus, and a reproduction processing method.

BACKGROUND

In the current video distribution, a two-dimensional video, which is used to distribute a movie or the like, is mainly distributed. Hereinafter, the two-dimensional video may be referred to as two-dimensional (2D) content. Further, a 360-degree video that can be viewed in all directions is also distributed on a video distribution site on the web. Being viewable in all directions indicates that a line-of-sight direction can be freely selected. The 360-degree video is called a 3 degrees of freedom (3DoF) video or 3DoF content. It is basic in both the 2D content and the 3DoF content that a two-dimensionally encoded video is distributed from a distribution server and displayed to a client.

There is also content called 3DoF+ content. The 3DoF+ content is content that can be viewed in all directions similarly to the 3DoF content and furthermore allows a slight shift of a viewpoint position. It is assumed that the shift of the viewpoint position in the 3DoF+ content is allowed in a range in which a user can move a head in a sitting state. In the 3DoF+ content, the shift of the viewpoint position is implemented by using one or a plurality of two-dimensionally encoded videos.

Furthermore, it has been proposed to distribute a 6DoF video, which is called 6DoF content, as a video with a higher degree of freedom. The 6DoF video is a video that can be viewed in all directions in a three-dimensional space and can be viewed by walking around in the three-dimensional space displayed. Walking around in the three-dimensional space means that a viewpoint position can be freely selected. Hereinafter, the three-dimensional space may be referred to as 3D space.

The 6DoF content is three-dimensional content in which a three-dimensional space is represented by one or a plurality of three-dimensional model data. The three-dimensional model data may be referred to as 3D model data, and the three-dimensional content may also be referred to as 3D content.

As an example of a method of distributing 6DoF content, the 6DoF content is transmitted as a plurality of object streams by configuring a three-dimensional space with a plurality of three-dimensional model data. At that time, configuration information about the three-dimensional space, which is called a scene description, may be used. An example thereof is a moving picture experts group (MPEG)-4 scene description. The scene description, which is a representation method, is a method in which a scene is represented by a graph having a tree hierarchical structure, which is called a scene graph, while the scene graph is represented in a binary format.

The 6DoF content is a video material representing a three-dimensional space with three-dimensional model data at each time. Examples of schemes for representing the 6DoF content include the following three schemes.

One scheme is a representation scheme referred to as an object-based representation scheme in the present invention. In the object-based representation scheme, 6DoF content has a content configuration in which three-dimensional model data for each three-dimensional object such as a person or a thing, which is an individual target object to be displayed in a video, is arranged in a three-dimensional space to represent the entire three-dimensional space. The object-based representation scheme is characterized in that a client who performs reproduction of 6DoF content simultaneously processes the largest number of three-dimensional model data between the three schemes. On the other hand, in the object-based representation scheme, definition can be changed in displaying each three-dimensional object such as an individual person or thing. Therefore, it can be said that the object-based representation scheme is a configuration method in which a client has a high degree of freedom in reproduction processing between the three methods.

Another one is a representation scheme referred to as a space-based representation scheme in the present invention. In the space-based representation scheme, 6DoF content has a content configuration in which an entire target three-dimensional space is represented as one three-dimensional model data without separating each three-dimensional object such as a person or a thing as three-dimensional model data. The space-based representation scheme is characterized in that a client processes one three-dimensional model data at the time of reproduction, requiring the lowest processing capability between the three schemes. On the other hand, it can be said that a client has an extremely low degree of freedom in reproduction processing, because the definition of the entire 6DoF content is fixed.

The other one is a combination of a space-based representation scheme and an object-based representation scheme. Hereinafter, this representation scheme will be referred to as a mixed-type representation scheme. In the mixed-type representation scheme, 6DoF content has a content configuration in which a specific three-dimensional object is represented by independent three-dimensional model data, and a three-dimensional space excluding the specific three-dimensional object is represented by one three-dimensional model data. In the mixed-type representation scheme, a client uses a plurality of three-dimensional model data in reproduction processing, but the number of three-dimensional model data is smaller than that used in the object-based representation scheme. That is, in the mixed-type representation scheme, a client is required to have a higher processing capability than that in the space-based representation scheme, but may have a lower processing capability than that in the object-based representation scheme. In addition, it can similarly be said that a client has a higher degree of freedom in reproduction processing than that in the space-based representation scheme and a lower degree of freedom in reproduction processing than that in the object-based representation scheme.

As described above, in each of the representation schemes, 6DoF content has a different content configuration.

At that point, in a case where a scene description is created to include several 6DoF contents in different representation schemes, it is preferable that the client selects a content configuration of a representation scheme in which the degree of freedom is as high as possible, such that the viewing experience of the user can be further expanded.

CITATION LIST

Non Patent Literature

Non Patent Literature 1: "ISO/IEC 14496-11:2015", Information technology. Coding of audio-visual objects. Part 11: Sene description and application engine, 2015-11

SUMMARY

Technical Problem

However, in a case where an appropriate content configuration is selected from a scene description, a client selects the content configuration after performing various analyses. Examples of the analyses include analysis of the entire scene description, analysis of AdaptationSet in media presentation description (MPD), and the like. Such analyses include analysis of what is not to be actually used, and thus can be said to be less efficient for a client device in selecting a content configuration.

Therefore, the present disclosure provides an information processing apparatus, an information processing method, a reproduction processing apparatus, and a reproduction processing method that enable a client device to efficiently select a content configuration.

Solution to Problem

According to the present disclosure, a preprocessing unit generates content configuration selection information, with respect to one or a plurality of contents, for determining whether or not each of the contents is reproducible, each of the contents having a content configuration including one or more three-dimensional objects and space arrangement information therefor to represent a virtual space. A file generation unit generates a file including data about the virtual space and the content configuration selection information.

BRIEF DESCRIPTION OF DRAWINGS

FIG. 5 is a diagram illustrating an example of syntax for an extended switch node in the first embodiment.

FIG. 10 is a diagram illustrating an example of syntax for content configuration selection information stored in SampleEntry in Modification (1) of the first embodiment.

FIG. 11 is a diagram illustrating an example of a group of content configuration selection information.

FIG. 14 is a diagram illustrating an example of syntax for a RequiedPerformance node.

FIG. 15 is a diagram illustrating an example of describing 6DoFContentStruct Descriptor.

FIG. 16 is a diagram illustrating semantics for CSC in Modification (5) of the first embodiment.

FIG. 18 is a diagram illustrating an example of syntax for an extended switch node in the second embodiment.

FIG. 19 is a diagram illustrating an example of the syntax for content configuration selection information stored in SampleEntry in Modification (1) of a third embodiment.

FIG. 20 is a diagram illustrating semantics for CSC in Modification (2) of the third embodiment.

DESCRIPTION OF EMBODIMENTS

Figure 1:
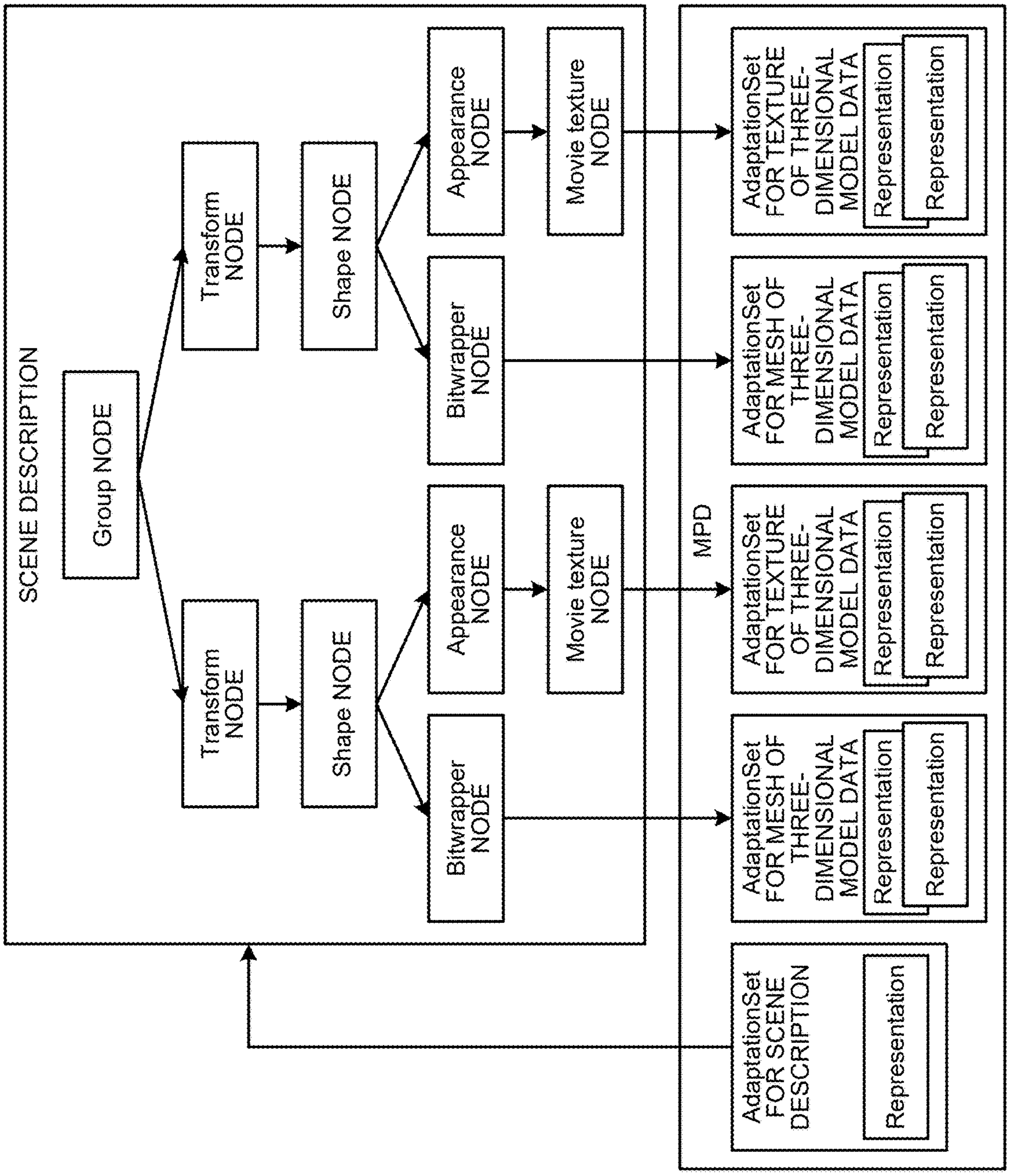
FIG. 1 is a diagram illustrating a configuration of 6DoF content.

Hereinafter, embodiments of the present disclosure will be described in detail with reference to the drawings. In the following respective embodiments, the same parts are denoted by the same reference numerals, and description thereof will not be repeated. In addition, the scope of the present technology disclosed herein is not limited to the embodiments, and the contents of the following non patent literatures disclosed at the time of filing the application are also incorporated herein.

Non Patent Literature 1: (as described above)

Non Patent Literature 2: "ISO/IEC 14496-12:2015", Information technology. Coding of audio-visual objects. Part 12: ISO base media file format, 2015-12

Non Patent Literature 3: "ISO/IEC 23009-1:2014", Information technology. Dynamic adaptive streaming over HTTP (DASH), Part 1: Media presentation description and segment formats, 2014-5

That is, the disclosures of the above-described non patent literatures are also incorporated into the present specification by reference. That is, the disclosures of the above-described non patent literatures also serve as a basis for determination as to support requirements. For example, even though the structures/terms used for the scene description described in Non Patent Literature 1, the file structure described in Non Patent Literature 2, and the terms used for the MPEG-DASH standard described in Non Patent Literature 3 are not directly described in the detailed description of the invention, they are considered to fall within the scope of the disclosure of the present technology and satisfy the support requirements of the claims. Similarly, for example, even though technical terms such as parsing, syntax, and semantics are not directly described in the detailed description of the invention, they are also considered to fall within the scope of the disclosure of the present technology and satisfy the support requirements of the claims.

In addition, the present disclosure will be described according to the following item order.

1. First Embodiment
1.1 Modification (1) of First Embodiment
1.2 Modification (2) of First Embodiment
1.3 Modification (3) of First Embodiment
1.4 Modification (4) of First Embodiment
1.5 Modification (5) of First Embodiment
2. Second Embodiment
2.1 Modification (1) of Second Embodiment
3. Third Embodiment
3.1 Modification (1) of Third Embodiment
3.2 Modification (2) of Third Embodiment
4. Fourth Embodiment

1. First Embodiment

When distributing 6DoF contents each having a content configuration in an object-based, space-based, or mixed-type representation scheme, for example, a scene description file, an MPD file, and a 3D model data file are configured as illustrated in FIG. 1 to be distributed. FIG. 1 is a diagram illustrating a configuration of 6DoF content. In such current content configurations, a client may determine whether or not a client device can sufficiently exhibit its own reproduction capability, based on the following three indexes.

A first index is an index for determining whether or not the scene description file and the three-dimensional model data file can be each individually decoded. A second index is an index for determining whether or not the scene description file and the three-dimensional model data file can be decoded together. A third index is an index for determining whether or not data rendering can be performed after decoding processing. The rendering refers to arrangement and display in a three-dimensional space. In a case where the client device determines whether or not reproduction processing can be performed with respect to each content configuration on the basis of such indexes, the use of the following information may be considered.

First information is a @mimeType attribute and a @codecs attribute stored in an AdaptationSet representing the scene description among AdaptationSets included in the MPD file. Based on this information, the client device determines whether or not the scene description can be decoded. More specifically, it can be determined whether or not the client device supports the file format of the scene description using the @mimeType attribute. In addition, it can be determined whether or not the client device is compatible with a codec encoding the scene description using the @codecs attribute. Accordingly, it is ascertained which format the scene description has been created in between a MPEG-4 scene description format and a GL transmission format (glTF) 2.0 format, and it is ascertained whether or not the client device can reproduce the scene description.

The second information is a sceneProfileLevelIndication filed stored in a case where the scene description is represented in an ISO base media file format (ISOBMFF). Based on this information, the client device determines whether or not data rendering can be performed after the scene description is decoded. This information includes information for determining a reproduction processing capability of the client device used to reconstruct a three-dimensional space from the scene graph (hierarchical structure) represented by the scene description (data on the scene graph). For example, in the case of a point cloud, the sceneProfileLevelIndication filed includes a maximum number of points for each scene, and in the case of a mesh, the sceneProfileLevelIndication filed includes a maximum number of vertices of a face, a maximum number of faces, and a maximum number of vertices for each scene. That is, based on this information, it is ascertained what degree of reproduction processing capability is required for the entire scene.

Third information is the number of external three-dimensional model data files for configuring the scene, which is obtained from the scene graph represented by the scene description file. Based on this information, the client device determines whether or not the scene description file and the three-dimensional model data file can be decoded. For example, the client device determines that reproduction is available when the number of its own decoders for three-dimensional model data is larger than the number of external three-dimensional model data files for configuring the scene. In this case, the larger the number of decoders used, the higher the reproduction processing capability required of the client device.

Fourth information is a @mimeType attribute and a @codecs attribute stored in an AdaptationSet representing each three-dimensional model data among AdaptationSets included in the MPD file. The @mimeType attribute includes, for example, information about a file format in which 3D model data is stored. In addition, the @codecs attribute includes information about what codec the 3D model data is encoded by and information about a profile or a level of the codec. Based on this information, the client device determines whether or not each three-dimensional model data can be decoded. More specifically, it can be determined whether or not the client device supports the file format of each three-dimensional model data using the @mimeType attribute. In addition, it can be determined whether or not the client device is compatible with the codec encoding each three-dimensional model data using the @codecs attribute.

Further, in a case where information about reproduction compatibility of three-dimensional model data is included in the @codecs attribute, the client device can determine whether or not rendering of each three-dimensional model data can be performed. In this case, for example, in a case where the three-dimensional model data is a point cloud, the @codecs attribute includes a maximum number of points, and in a case where the three-dimensional model data is a mesh, the @codecs attribute includes a maximum number of vertices of a face, a maximum number of faces, and a maximum number of vertices.

Fifth information is a @bandwidth attribute stored in a Representation included in the MPD file for each three-dimensional model data. Based on this information, the client device determines whether or not each three-dimensional model data can be decoded. For example, by using this information, the client device can determine whether the bit rate is a bit rate at which the three-dimensional model data can be reproduced alone or a bit rate at which the three-dimensional model data can be reproduced in the entire scene.

Among the above-described information, the first, fourth, and fifth information are used as the first index, the third, fourth, and fifth information are used as the second index, and the second and fourth information are used as the third index.

Here, a content creator desires to provide a user with content that can be reproduced in a degree of freedom as high as possible, thereby enhancing the value of the content.

Meanwhile, it is preferable that the number of reproducible client devices is large. Thus, the content creator may consider preparing a plurality of content configurations to distribute 6DoF content. Hereinafter, the content configurations of the object-based, space-based, and mixed-type representation schemes will be referred to as an object-based content configuration, a space-based content configuration, and a mixed-type content configuration, respectively.

For example, in a case where the content creator prepares a mixed-type content configuration and a space-based content configuration, the client device selects the mixed-type content configuration for reproduction if its reproduction processing capability is high, but selects the space-based content configuration for reproduction if its reproduction processing capability is low. In this case, the scene description is created to include two content configurations. In this case, conventionally, in order to select a content configuration, the client device has analyzed the entire scene description and analyzed the information described in AdaptationSets of MPD for three-dimensional model data for configuring a scene using the first to fifth information. This processing is not efficient because a content configuration that is not to be actually used in each scene is analyzed.

However, in a 6DoF content distribution system according to the related art, a client device is not provided with information for determining which one of contents having different content configurations from each other can be reproduced. For that reason, it has been difficult for the client device to determine whether or not reproduction processing is available unless decoding and rendering are actually performed. Therefore, a system enabling a client device to efficiently select a content configuration will be described.

[Configuration of System According to First Embodiment]

Figure 2:
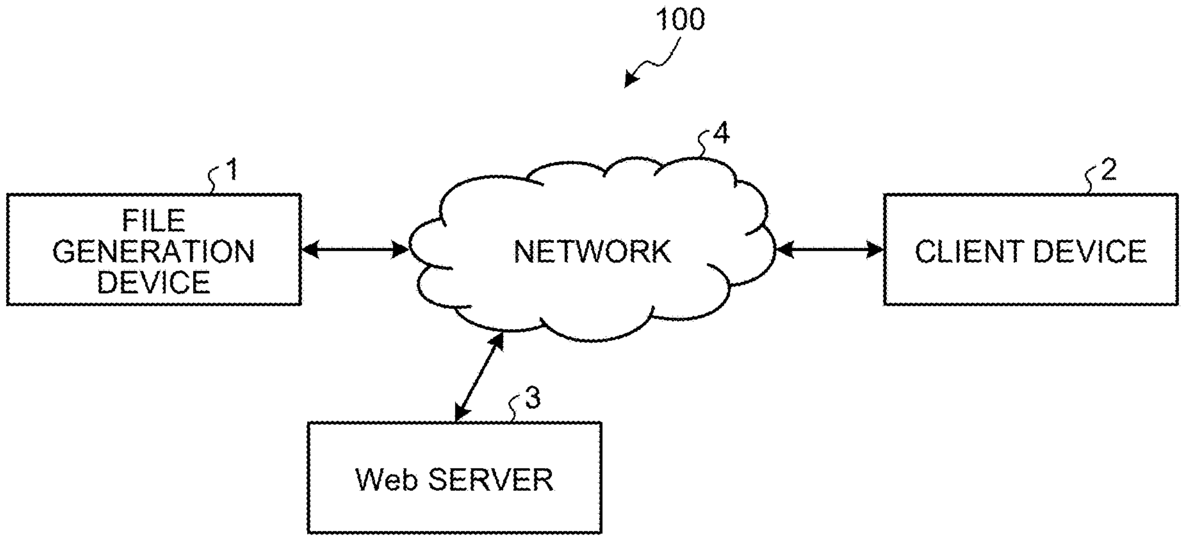
FIG. 2 is a system configuration diagram of an example of a distribution system.

FIG. 2 is a system configuration diagram of an example of a distribution system. The distribution system 100 includes a file generation device 1 that is an information processing apparatus, a client device 2 that is a reproduction processing apparatus, and a Web server 3. The file generation device 1, the client device 2, and the Web server 3 are connected to a network 4. Then, the file generation device 1, the client device 2, and the Web server 3 can communicate with each other via the network 4. Here, although it is illustrated in FIG. 1 that each kind of device is included as one device, the distribution system 100 may include a plurality of file generation devices 1 and a plurality of client devices 2.

The file generation device 1 generates 6DoF content. The file generation device 1 uploads the generated 6DoF content to the Web server 3. Here, although it is described in the present embodiment that the Web server 3 provides the 6DoF content to the client device 2, the distribution system 100 can adopt another configuration. For example, the file generation device 1 may include the functions of the Web server 3 to store the generated 6DoF content therein by itself, and provide the stored 6DoF content to the client device 2.

The Web server 3 retains the 6DoF content uploaded from the file generation device 1. Then, the Web server 3 provides the 6DoF content designated by a request from the client device 2.

The client device 2 transmits a request to the Web server 3 to transmit the 6DoF content thereto. Then, the client device 2 acquires the 6DoF content designated by the request for transmission from the Web server 3. Then, the client device 2 decodes the 6DoF content to generate a video, such that the video is displayed on a display device such as a monitor.

Here, the 6DoF content will be described. The 6DoF content represents a three-dimensional space with one or more three-dimensional objects. The three-dimensional object is represented using a coordinate system in a bounding box normalized by a local coordinate system of the 6DoF content, and compressed and encoded into a bitstream. Scene description is used to arrange the bit stream in the three-dimensional space.

There are a plurality of standards for the scene description Basically, a scene displaying each three-dimensional object at each time is represented by a graph in a tree hierarchical structure, which is called a scene graph, and the scene graph is represented in a binary format or in a text format. Here, the scene graph is space display control information, and information related to the display of the three-dimensional object is configured by defining a node as a constituent unit and hierarchically combining a plurality of nodes. The nodes include a node for information about coordinate transformation from one coordinate system to another coordinate system, a node for information about a position and a size of a three-dimensional object, and a node for information about access to a three-dimensional object and audio data.

Note that, in the following description, it is assumed that the 6DoF content includes scene description data that is space display control information and media data of a plurality of three-dimensional objects (that is represented in accordance with, for example, mesh data and texture data of the three-dimensional objects). In addition, the 6DoF content may include audio data. The media data about the three-dimensional objects is also applicable in another format, such as point cloud. Further, in the present embodiment, the scene description file is based on MPEG-4 Scene Description (ISO/IEC 14496-11).

MPEG-4 Scene Description data is obtained by binarizing the scene graph in a format called a binary format for scenes (BIFS). The scene graph can be transformed into the BIFS using a predetermined algorithm. Furthermore, a scene can be regulated at each time by storing a scene description in ISOBMFF, thereby making it possible to represent a three-dimensional object whose position and size change.

[Configuration of File Generation Device According to First Embodiment]

Figure 3:
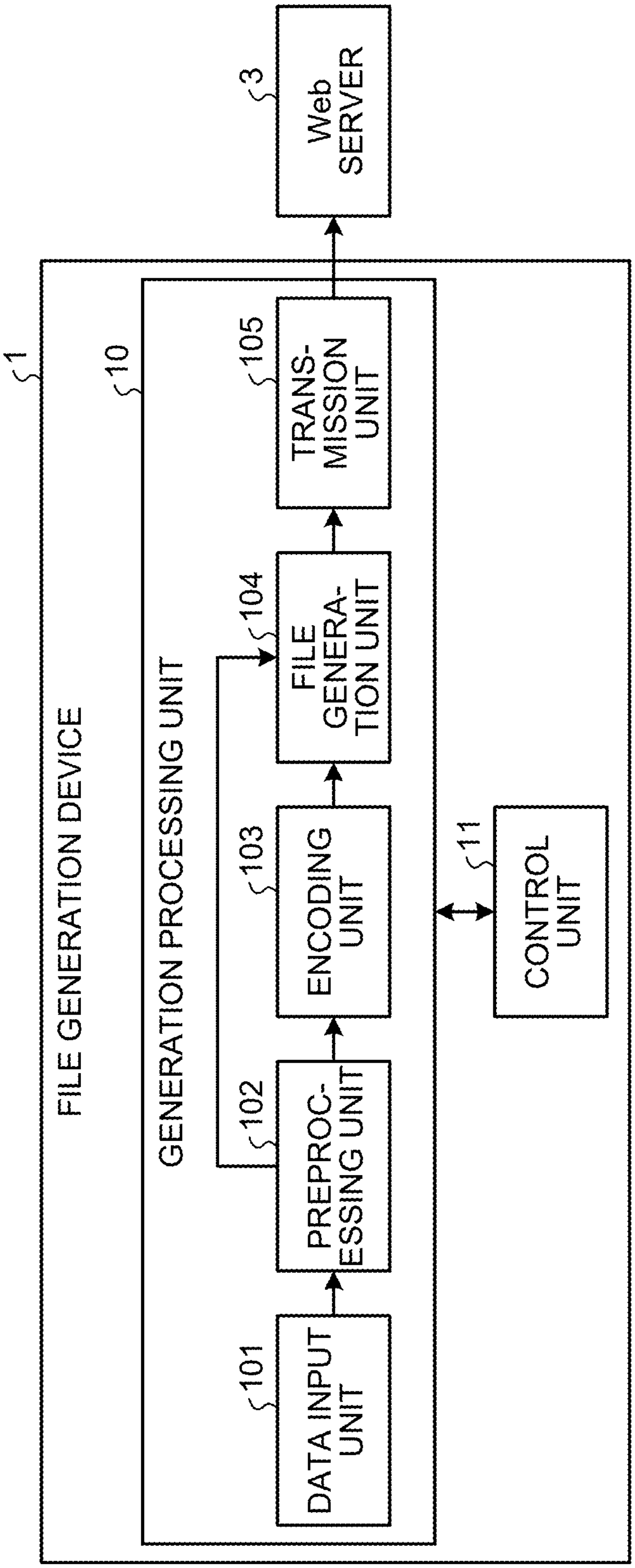
FIG. 3 is a block diagram of a file generation device.

Next, the file generation device 1 will be described in detail. FIG. 3 is a block diagram of the file generation device. As illustrated in FIG. 3, the file generation device 1, which is an information processing apparatus, includes a generation processing unit 10 and a control unit 11. The control unit 11 executes processing for controlling the generation processing unit 10. For example, the control unit 11 collectively controls operation timings of the respective parts of the generation processing unit 10 and the like. The generation processing unit 10 includes a data input unit 101, a preprocessing unit 102, an encoding unit 103, a file generation unit 104, and a transmission unit 105.

The data input unit 101 receives an input of original information for generating a three-dimensional object, meta information, and the like. The data input unit 101 outputs the acquired original information to the preprocessing unit 102. The data input unit 101 receives an input of data. The data received by the data input unit 101 includes 3D objects and metadata such as information about arrangement of the 3D objects. The data input unit 101 outputs the acquired data to the preprocessing unit 102.

The preprocessing unit 102 receives the input of the data including the 3D objects and the metadata such as information about arrangement of the 3D objects from the data input unit 101. Then, the preprocessing unit 102 determines a bit stream configuration on the basis of the acquired data, and generates a scene graph using the metadata of each 3D object and information about access to the bit stream. The metadata includes control information such as what codec is used for compression.

In addition, the preprocessing unit 102 generates content configuration selection information for each content configuration, the content configuration selection information including any information of the above-described first to fifth information for one or more content configurations. The content configuration selection information provides an index of a reproduction processing capability required for reproducing a scene of each content configuration.

Then, the preprocessing unit 102 stores the content configuration selection information for each content configuration in the scene description. Accordingly, the client device 2 can select a content configuration capable of reproduction processing by using the content configuration selection information. Hereinafter, the storage of the content configuration selection information according to the present embodiment will be described in detail.

Figure 4:
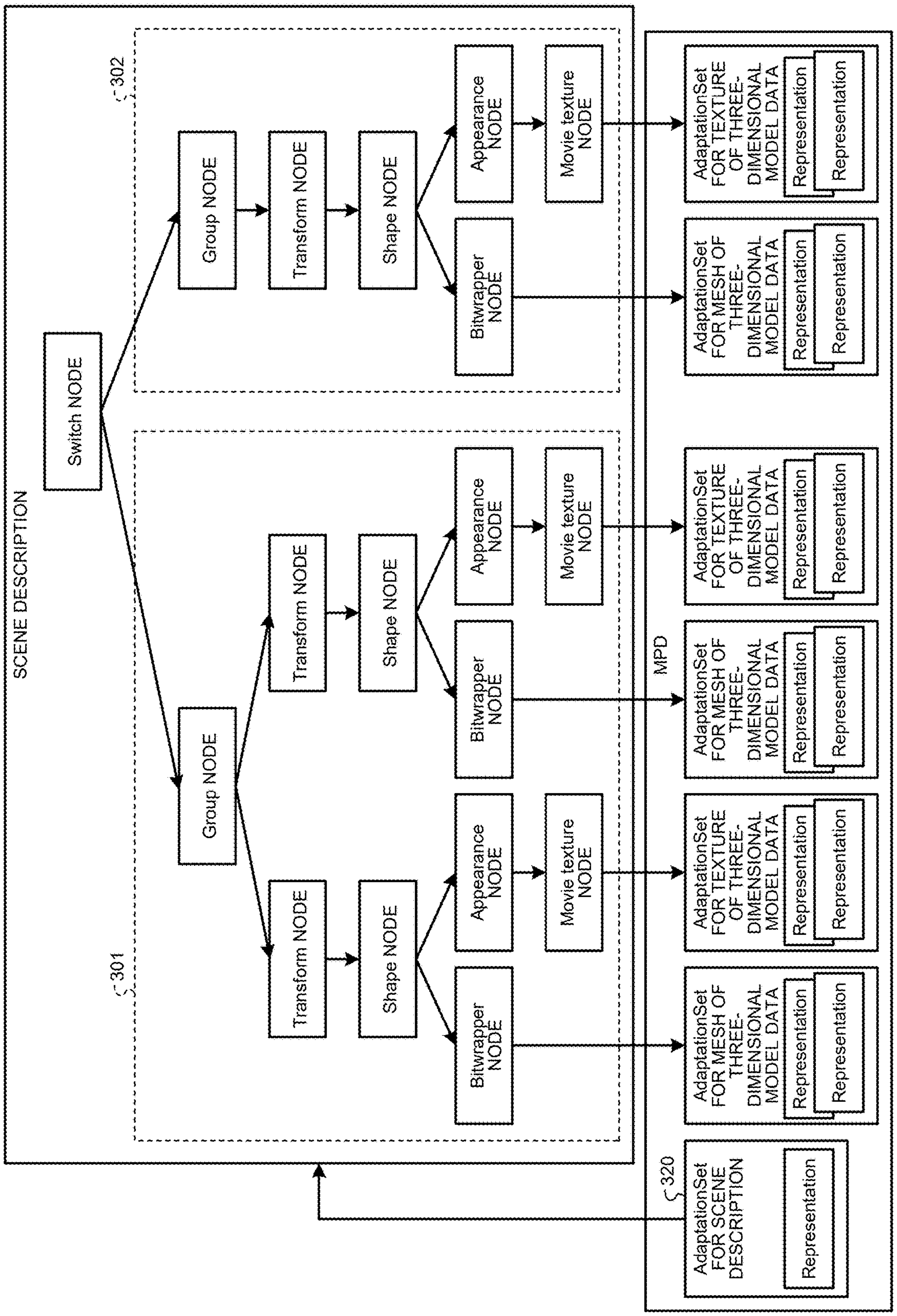
FIG. 4 is a diagram for describing a method of storing content configuration selection information according to a first embodiment.

FIG. 4 is a diagram for describing a method of storing content configuration selection information according to the first embodiment. As illustrated in FIG. 4, the preprocessing unit 102 aligns child nodes under the switch node in the scene description for each content configuration. In FIG. 4, for example, a content configuration 301 is a content configuration in a mixed-type representation scheme, and a content configuration 302 is a content configuration in a space-based representation scheme. The preprocessing unit 102 extends the switch node to store information to be used for determining whether or not decoding and rendering can be performed with respect to an entire scene in each content configuration as content configuration selection information.

FIG. 5 is a diagram illustrating an example of syntax for the extended switch node in the first embodiment. For example, the preprocessing unit 102 indicates a plurality of content configurations in a choice field of the switch node. Further, the preprocessing unit 102 newly adds a Points field, a VertivesParFace field, a Faces field, an Indices field, a Num3DmodeData field, a 3DmodelDataMimeType field, a 3DmodeDataCodec field, and a Bitrate field indicating content configuration selection information for each content configuration. Then, the preprocessing unit 102 stores values for each content configuration by storing values in the newly added fields in a content configuration order indicated in the choice field.

Points is the number of points of a point cloud. VertivesParFace is the number of vertices of a face of a mesh. Faces is the number of faces of a mesh. Indices is the number of vertices of a mesh. The Points, VertivesParFace, Faces, and Indices correspond to the second information. Num3DmodelData is the number of externally referred-to three-dimensional model data. The Num3DmodelData corresponds to the third information. 3DmodelDataMimeType is a MimeType of externally referred-to three-dimensional model data. 3DmodelDataCodec is a codec of externally referred-to three-dimensional model data. The Num3DmodelData and 3DmodelDataCodec correspond to the fourth information. Bitrate is a bit rate including externally referred-to three-dimensional model data. The Bitrate corresponds to the fifth information.

The preprocessing unit 102 outputs the three-dimensional object and the generated scene graph to the encoding unit 103. The preprocessing unit 102 also outputs the metadata to the file generation unit 104.

The encoding unit 103 receives inputs of the three-dimensional object and the scene graph from the preprocessing unit 102. Then, the encoding unit 103 encodes the three-dimensional object to generate a bit stream. Also, the encoding unit 103 encodes the acquired scene graph to generate a scene description. Thereafter, the encoding unit 103 outputs the generated bit stream and scene description to the file generation unit 104.

The file generation unit 104 receives inputs of the bit stream and the scene description from the encoding unit 103. The file generation unit 104 also receives an input of the metadata from the preprocessing unit 102. Then, the file generation unit 104 stores the acquired bit stream in an ISOBMFF file for each segment to be converted into a file, thereby generating a segment file for the bit stream. The file generation unit 104 also stores data about the scene description in an ISOBMFF file for each segment to be converted into a file, thereby generating a segment file for the scene description.

In addition, the file generation unit 104 generates a media presentation description (MPD) file on the basis of the data acquired from the preprocessing unit 102. In the MPD file, a media type and meta information of 6DoF content such as information about a segment file for a moving image or a sound are stored.

The transmission unit 105 acquires the ISOBMFF files of the bit stream and the scene description and the MPD file from the file generation unit 104, and transmits and uploads the acquired files to the Web server 3.

[Configuration of Client Device According to First Embodiment]

Figure 6:
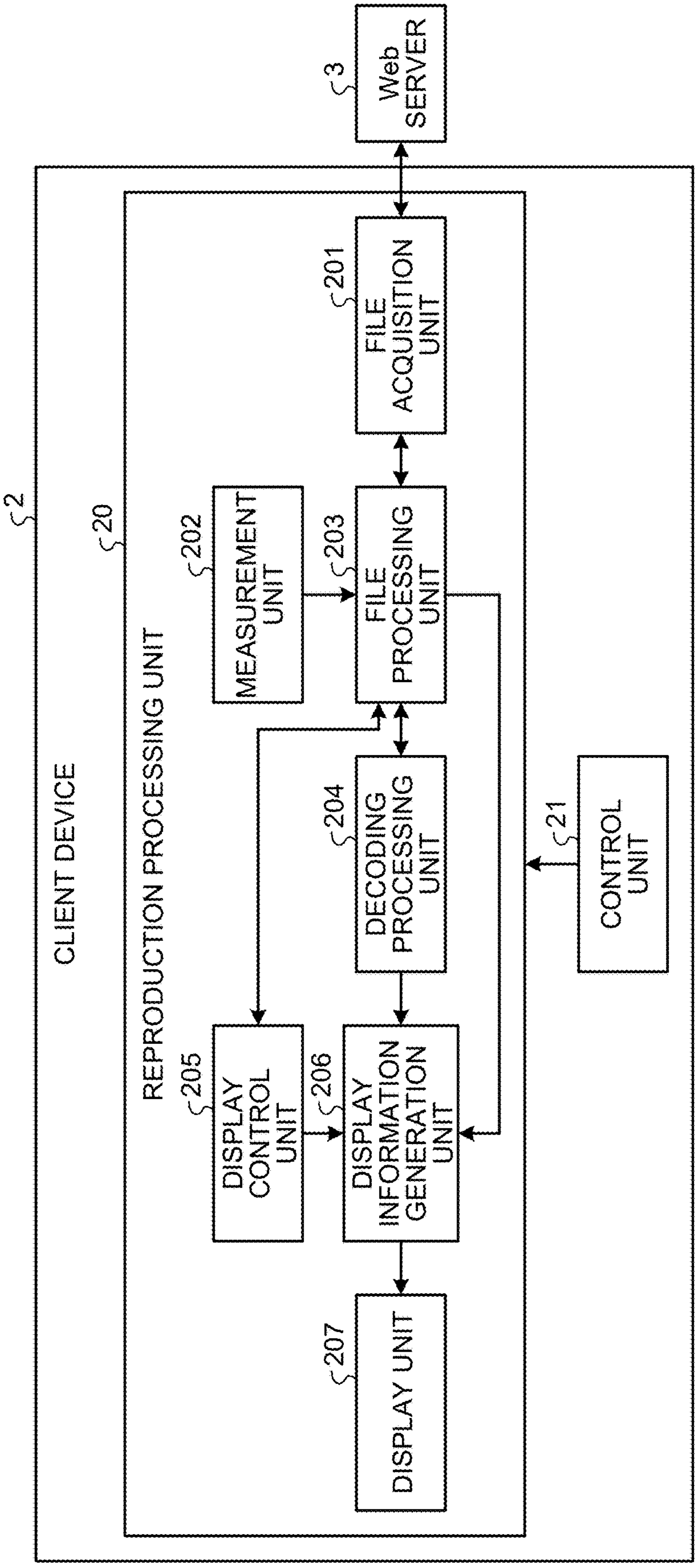
FIG. 6 is a block diagram of a client device.

FIG. 6 is a block diagram of the client device. As illustrated in FIG. 6, the client device 2 includes a reproduction processing unit 20 and a control unit 21. The control unit 21 controls operation of each part of the reproduction processing unit 20. For example, the control unit 21 collectively controls operation timings of the respective parts of the reproduction processing unit 20. The reproduction processing unit 20 includes a file acquisition unit 201, a measurement unit 202, a file processing unit 203, a decoding processing unit 204, a display control unit 205, a display information generation unit 206, and a display unit 207.

The file acquisition unit 201 acquires an MPD file corresponding to 6DoF content to be reproduced from the Web server 3. Then, the file acquisition unit 201 acquires information about a scene description of the 6DoF content to be reproduced on the basis of the MPD file.

The file acquisition unit 201 accesses the Web server 3 and acquires an ISOBMFF file in which the scene description of 6DoF content to be displayed is stored. Then, the file acquisition unit 201 outputs the ISOBMFF file, in which the scene description is stored, to the file processing unit 203.

Further, the file acquisition unit 201 acquires information about a bit stream selected by the file processing unit 203 from the file processing unit 203. Then, the file acquisition unit 201 accesses the Web server 3 and acquires a segment file for the selected bit stream. Thereafter, the file acquisition unit 201 outputs the acquired segment file for the bit stream to the file processing unit 203.

The measurement unit 202 measures a transmission band of a transmission path between the client device 2 and the Web server. Then, the measurement unit 202 outputs a result of measuring the transmission band to the file processing unit 203.

The file processing unit 203 receives an input of the MPD file corresponding to the 6DoF content to be reproduced from the file acquisition unit 201. Then, the file processing unit 203 parses the acquired MPD file to acquire information about a scene description of the 6DoF content to be reproduced. The file processing unit 203 also recognizes a plurality of data to be used for adaptive distribution. For example, if the adaptive distribution is for switching a bit rate, information about a segment file for a bit stream corresponding to each bit rate is acquired. In this case, the file processing unit 203 outputs the information about the scene description of the 6DoF content to be reproduced to the file acquisition unit 201.

The file processing unit 203 receives an input of the ISOBMFF file, in which the scene description is stored, from the file acquisition unit 201. The file processing unit 203 parses the acquired ISOBMFF file. Then, the file processing unit 203 acquires a switch node of the scene description. Thereafter, the file processing unit 203 acquires content configuration selection information from the switch node. Next, the file processing unit 203 selects a content configuration to be used according to a reproduction processing capability of the client device 2 from the acquired content configuration selection information. Thereafter, the file processing unit 203 acquires child nodes in a scene graph corresponding to the selected content configuration. Then, the file processing unit 203 acquires coordinate transformation information, arrangement information of the three-dimensional object, and access information in the scene of the selected content configuration.

In addition, the file processing unit 203 receives an input of the result of measuring the transmission band from the measurement unit 202. Then, the file processing unit 203 selects a segment file for a bit stream to be reproduced on the basis of a result of parsing the scene description, information indicating the transmission band acquired from the measurement unit 202, and the like. Then, the file processing unit 203 outputs information about the selected segment file for the bit stream to the file acquisition unit 201. In this case, the adaptive distribution according to the bit rate is implemented by changing the segment file for the bit stream to be selected according to the transmission band.

Thereafter, the file processing unit 203 receives an input of the selected segment file for the bit stream from the file acquisition unit 201. Then, the file processing unit 203 extracts bit stream data from the acquired segment file for the bit stream and outputs the extracted data to the decoding processing unit 204.

The decoding processing unit 204 receives an input of the bit stream data from the file processing unit 203. Then, the decoding processing unit 204 decodes the acquired bit stream data. Thereafter, the decoding processing unit 204 outputs the decoded bit stream data to the display information generation unit 206.

The display control unit 205 receives an input of information about a viewpoint position and a line-of-sight direction of an operator from an input device, which is not illustrated. Then, the display control unit 205 outputs the acquired information about the viewpoint position and the viewpoint direction to the display information generation unit 206.

The display control unit 205 also receives, from the file processing unit 203, an input of information about what kind of three-dimensional object there is. Alternatively, the operator can input designation information indicating a three-dimensional object of interest using the input device, instead of the information about the viewpoint position and the line-of-sight. The display control unit 205 acquires the designation information indicating the three-dimensional object of interest designated by the operator. Then, for example, in a case where the three-dimensional object is tracked to view, the display control unit 205 outputs the information about the viewpoint position and the viewpoint direction to the display information generation unit 206 to track the three-dimensional object designated as the designation information over time. Accordingly, an image for tracking the three-dimensional object designated, for example, by the operator can be displayed. In addition, for example, in a case where the position of the three-dimensional object is displayed, the display control unit 205 generates information for specifying the designated three-dimensional object in the 6DoF content.

The display information generation unit 206 receives the scene description, the decoded bit stream data, and the acquired information about the viewpoint position and viewpoint direction to generate display information. The display information generation unit 206 will be described in detail below.

The input of the bit stream data is received from the decoding processing unit 204. Then, the display information generation unit 206 arranges the three-dimensional object, which is the acquired bit stream data, in the three-dimensional space on the basis of the scene description. Further, the display information generation unit 206 receives the input of the information about the viewpoint position and the line-of-sight direction of the operator from the display control unit 205. Then, the display information generation unit 206 performs rendering of the three-dimensional object arranged in the three-dimensional space in accordance with the viewpoint position and the line-of-sight direction to generate an image for display. Thereafter, the display information generation unit 206 supplies the generated image for display to the display unit 207.

The display unit 207 includes a display device such as a monitor. The display unit 207 receives an input of the image for display generated by the display information generation unit 206. Then, the display unit 207 displays the acquired image for display on the display device.

[File Generation Procedure According to First Embodiment]

Figure 7:
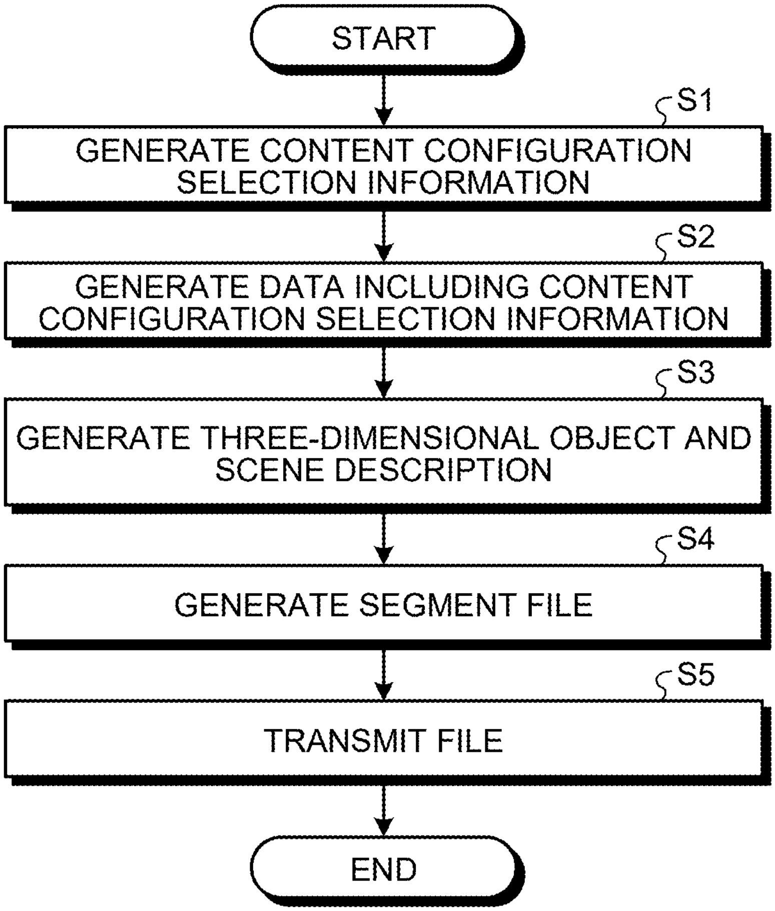
FIG. 7 is a flowchart of file generation processing by the file generation device according to the first embodiment.

Next, a flow of file generation processing by the file generation device 1 according to the first embodiment will be described in detail with reference to FIG. 7. FIG. 7 is a flowchart of file generation processing by the file generation device according to the first embodiment.

The preprocessing unit 102 generates content configuration selection information (Step S1). In the present embodiment, the preprocessing unit 102 generates the content configuration selection information to be stored in a switch node of a scene description graph.

Then, the preprocessing unit 102 generates data of the scene graph in which the content configuration selection information is stored in the switch node (Step S2). The preprocessing unit 102 outputs the data of the scene graph, in which the content configuration selection information is stored in the switch node, to the encoding unit 103.

Next, the encoding unit 103 encodes the data about a three-dimensional object to generate a bit stream of the three-dimensional object. In addition, the encoding unit 103 encodes the acquired scene graph to generate a scene description (Step S3).

Next, the file generation unit 104 stores the acquired bit stream in an ISOBMFF file for each segment to generate a segment file for the bit stream. In addition, the file generation unit 104 stores data about the scene description in an ISOBMFF file for each segment to generate a segment file for the scene description (Step S4).

The transmission unit 105 outputs the segment files generated by the file generation unit 104 to the Web server 3 (Step S5).

[Reproduction Processing Procedure According to First Embodiment]

Figure 8:
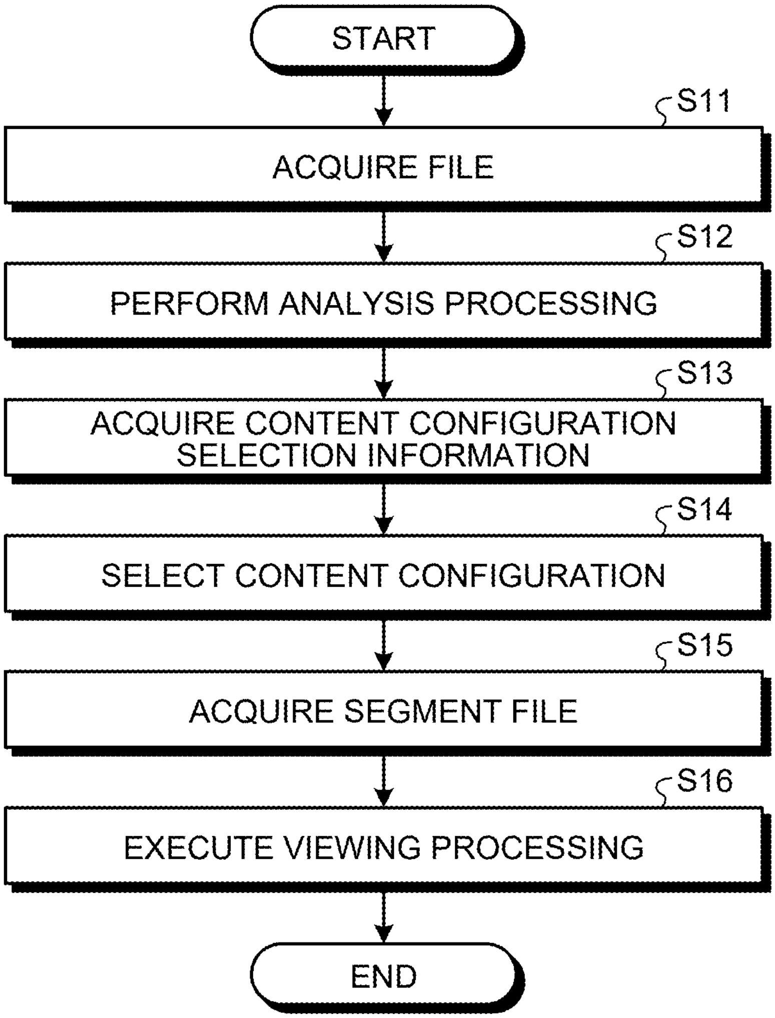
FIG. 8 is a flowchart of reproduction processing executed by the client device according to the first embodiment.

Next, a flow of reproduction processing executed by the client device 2 according to the present embodiment will be described with reference to FIG. 8. FIG. 8 is a flowchart of reproduction processing executed by the client device according to the first embodiment.

The file acquisition unit 201 acquires an MPD file corresponding to 6DoF content to be reproduced from the Web server 3 (Step S11). The file acquisition unit 201 outputs the acquired MPD file to the file processing unit 203.

The file processing unit 203 executes analysis processing by parsing the MPD file input from the file acquisition unit 201 (Step S12). The file processing unit 203 specifies a scene description of the 6DoF content to be reproduced on the basis of an analysis result.

Then, the file acquisition unit 201 acquires the scene description specified by the file processing unit 203. Next, the file processing unit 203 parses the scene description acquired by the file acquisition unit 201 to acquire a switch node. Next, the file processing unit 203 acquires content configuration selection information from the switch node (Step S13).

Then, the file processing unit 203 selects a content configuration according to a reproduction processing capability of the client device 2 using the acquired content configuration selection information (Step S14).

Next, the file processing unit 203 parses a child node corresponding to the selected content configuration. Thereafter, the file processing unit 203 acquires a segment file for a bit stream corresponding to the 6DoF content to be reproduced on the basis of a parsing result (Step S15). The decoding processing unit 204 decodes the segment file for the bit stream. Thereafter, the decoding processing unit 204 outputs bit stream data to the display information generation unit 206.

The display control unit 205 outputs input information about a viewpoint position and a line-of-sight direction to the display information generation unit 206. The display information generation unit 206 executes viewing processing by rendering the three-dimensional object and adding position information using the information about the viewpoint position and the line-of-sight direction acquired from the display control unit 205 to generate an image for display and displaying the generated image for display on the display unit 207 (Step S16).

As described above, the file generation device according to the present embodiment stores content configuration selection information in the switch node, which is a root node of the scene description, and provides the content configuration selection information to the client device. The client device acquires the switch node, which is the root node of the scene description, to obtain the content configuration selection information, and selects a content configuration using the acquired content configuration selection information.

In a configuration in which content configuration selection information is not stored, the entire scene description has been analyzed to collect information for selecting a content configuration. In contrast, in the distribution system according to the present embodiment, the client device can acquire the content configuration selection information once the switch node is acquired, and can acquire the information for selecting a content configuration without having to analyze other nodes for the scene description. Therefore, it is possible to efficiently select a content configuration.

A content creator can prepare a plurality of content configurations so that 6DoF content can be distributed to correspond to client devices having different reproduction capabilities. Then, the client device can efficiently select a content configuration according to its own reproduction processing capability.

1.1 Modification (1) of First Embodiment

A file generation device 1 according to the present modification is different from that according to the first embodiment in that content configuration selection information is stored in SampleEntry of an ISOBMFF file for scene description.

A preprocessing unit 102 of the file generation device 1 according to the present modification generates content configuration selection information as meta. Then, the preprocessing unit 102 transmits metadata including the content configuration selection information to a file generation unit 104.

The file generation unit 104 receives inputs of the bit stream and the scene description from the encoding unit 103. The file generation unit 104 also receives an input of the metadata including the content configuration selection information from the preprocessing unit 102.

Concerning the bit stream, the file generation unit 104 stores the acquired bit stream in an ISOBMFF file for each segment to be converted into a file, thereby generating a segment file for the bit stream, similarly to that in the first embodiment.

On the other hand, when data about the scene description is stored in an ISOBMFF file, the file generation unit 104 acquires the content configuration selection information from the metadata. Then, the file generation unit 104 stores the content configuration selection information in the SampleEntry of the ISOBMFF file for scene description.

Figure 9:
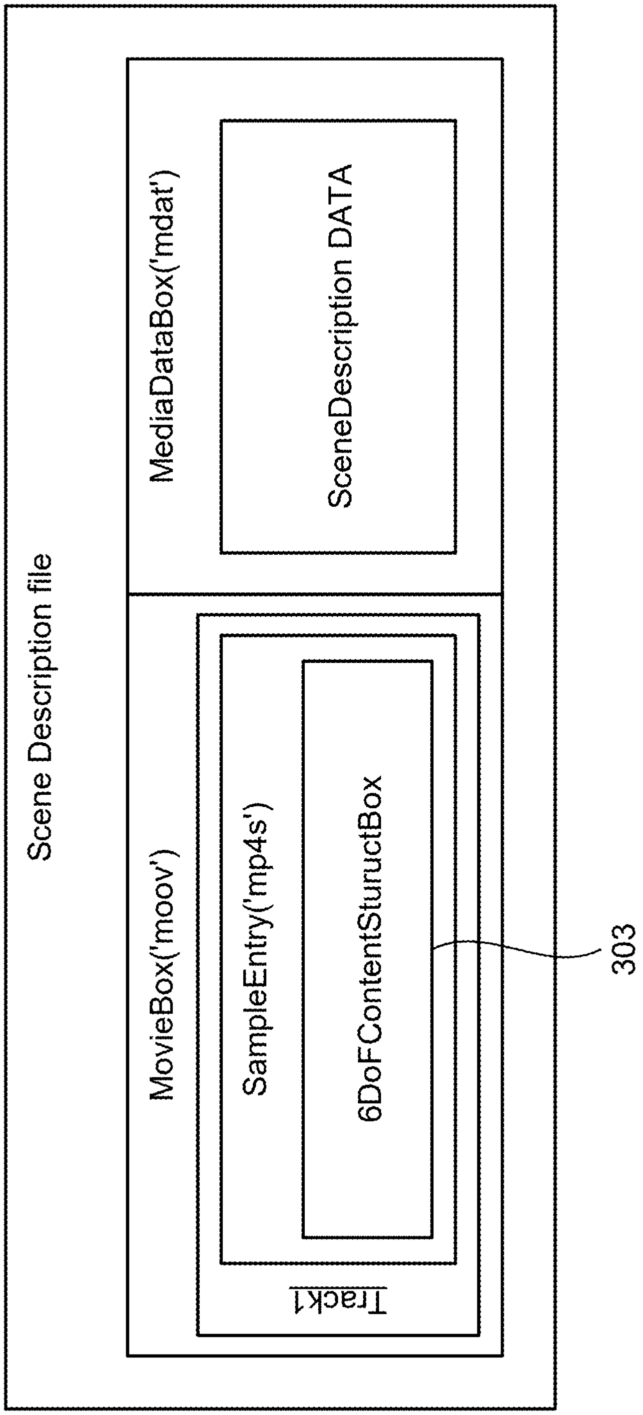
FIG. 9 is a diagram illustrating an ISOBMFF file for scene description in Modification (1) of the first embodiment.

For example, as illustrated in FIG. 9, the file generation unit 104 newly adds 6DoFContentStructBox illustrated as BOX 303 to the SampleEntry of the ISOBMFF file for scene description. FIG. 9 is a diagram illustrating an ISOBMFF file for scene description in Modification (1) of the first embodiment. Then, the file generation unit 104 stores the content configuration selection information for each content configuration in the 6DoFContentStructBox.

For example, the file generation unit 104 stores content configuration selection information indicated by syntax illustrated in FIG. 10 in the 6DoFContentStructBox. FIG. 10 is a diagram illustrating an example of the syntax for the content configuration selection information stored in the SampleEntry in Modification (1) of the first embodiment. The file configuration selection information in this case is the same information as the newly added fields in the first embodiment as illustrated in FIG. 5.

In this way, the file generation unit 104 stores the data about the scene description in an ISOBMFF file for each segment to be converted into a file, thereby generating a segment file for the scene description. Then, the file generation unit 104 outputs the ISOBMFF file for scene description including file configuration information to the transmission unit 105.

A file processing unit 203 of a client device 2 according to the present modification receives an input of the ISOBMFF file for scene description from a file acquisition unit 201. Then, Initialization Segment of the ISOBMFF file for scene description is acquired. Next, the file processing unit 203 acquires the content configuration selection information from the 6DoFContentStructBox in the acquired Initialization Segment. Then, the file processing unit 203 selects a content configuration to be used from the scene description using the acquired content configuration selection information.

As described above, the client device according to the present modification can acquire content configuration selection information before analyzing the scene description itself, thereby selecting a content configuration without analyzing the scene description itself. In this way, the client device according to the present embodiment does not need to analyze the scene description itself to select a content configuration. The configuration of Modification (1) is valid in a case where the reproduction processing capability required for reproduction in the content configuration does not change every time period. In this case, it is not necessary to extend the scene description itself.

1.2 Modification (2) of First Embodiment

A file generation device 1 according to the present modification is different from that according to the first embodiment in that a value of each content configuration selection information is determined for grouping, and it is indicated according to the grouping what group each content configuration belongs to, thereby indicating content configuration selection information of each content configuration.

FIG. 11 is a diagram illustrating an example of a group of content configuration selection information. In a table of FIG. 11, groups to which 01 to 03 are given as RequiedPerformanceID, which is an identification number, are set. Then, for each group, it is indicated what value is set for each content configuration selection information.

A preprocessing unit 102 of the file generation device 1 according to the present embodiment has information about the groups of content configuration selection information illustrated in FIG. 11. Then, the preprocessing unit 102 stores, in a switch node, information indicated by RequiedPerformanceID as to which group each content configuration corresponds to.

The file processing unit 203 of the client device 2 according to the present embodiment analyzes the switch node of the scene description to acquire RequiedPerformanceID of a group to which each content configuration belongs. Then, the file processing unit 203 selects a content configuration by determining a reproduction processing capability required for reproduction in each content configuration from content configuration selection information allocated to a group to which each content configuration belongs.

As described above, the file generation device according to the present embodiment notifies content configuration selection information for each content configuration using the groups of content configuration selection information. Accordingly, it is not necessary to generate detailed content configuration selection information for each content configuration, making the processing for generating the content configuration selection information simple. This scheme is also applicable to Modification (1) of the first embodiment.

1.3 Modification (3) of First Embodiment

A file generation device 1 according to the present modification is different from that according to the first embodiment in that Matroska Media Container (http://www.matroska.org/) is used, instead of ISOBMFF, as a file format at the time of transmitting three-dimensional model data.

Figure 12:
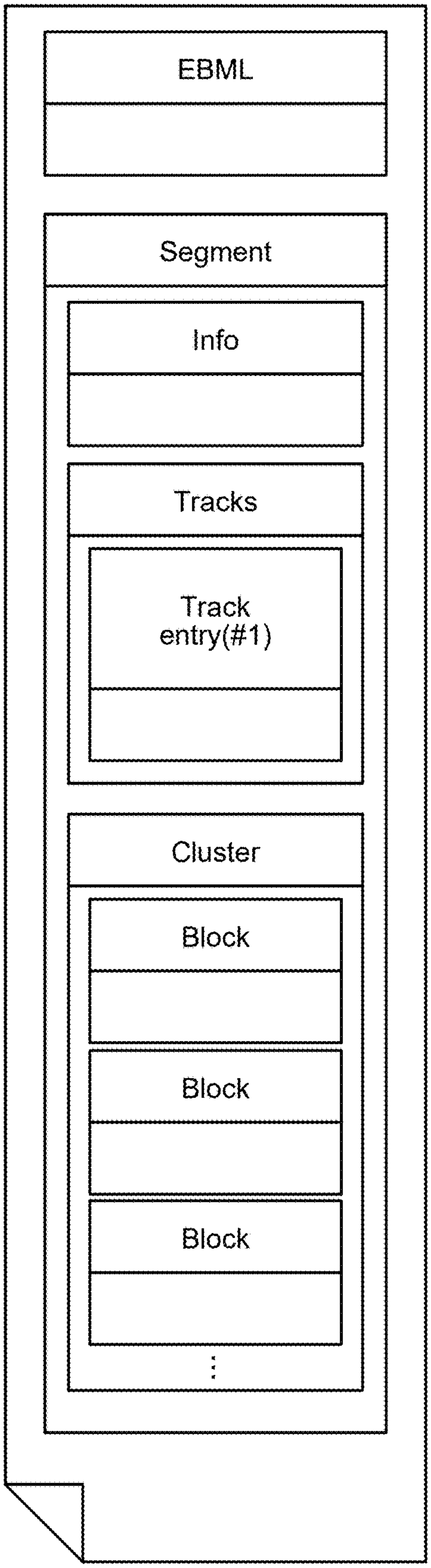
FIG. 12 is a diagram illustrating a Matroska Media Container format.

FIG. 12 is a diagram illustrating a Matroska Media Container format. A file generation unit 104 of the file generation device 1 according to the present modification stores a 6DoFContentStruct element having content configuration selection information in a Track Entry element. At this time, the file generation unit 104 sets Element Type as binary, and stores SelectContentStructMetadata( ), which is illustrated in FIG. 10, as binary data for extensible binary meta language (EBML) data.

A file processing unit 203 of a client device 2 according to the present modification acquires Initialization Segment of a Matroska Media Container file including scene description. Then, the file processing unit 203 acquires the content configuration selection information from the 6DoFContentStruct element included in the Initialization Segment to select a content configuration.

In this way, even in a case where a container format different from that in Modification (1) is used, content configuration selection information is provided, such that the client device can select a container configuration. Furthermore, although container configuration selection information is generated for each container configuration in the present modification, the present modification is not limited thereto, and for example, Element Type can be stored as Integer to indicate RequiedPerformanceID as in Modification (2).

1.4 Modification (4) of First Embodiment

Figure 13:
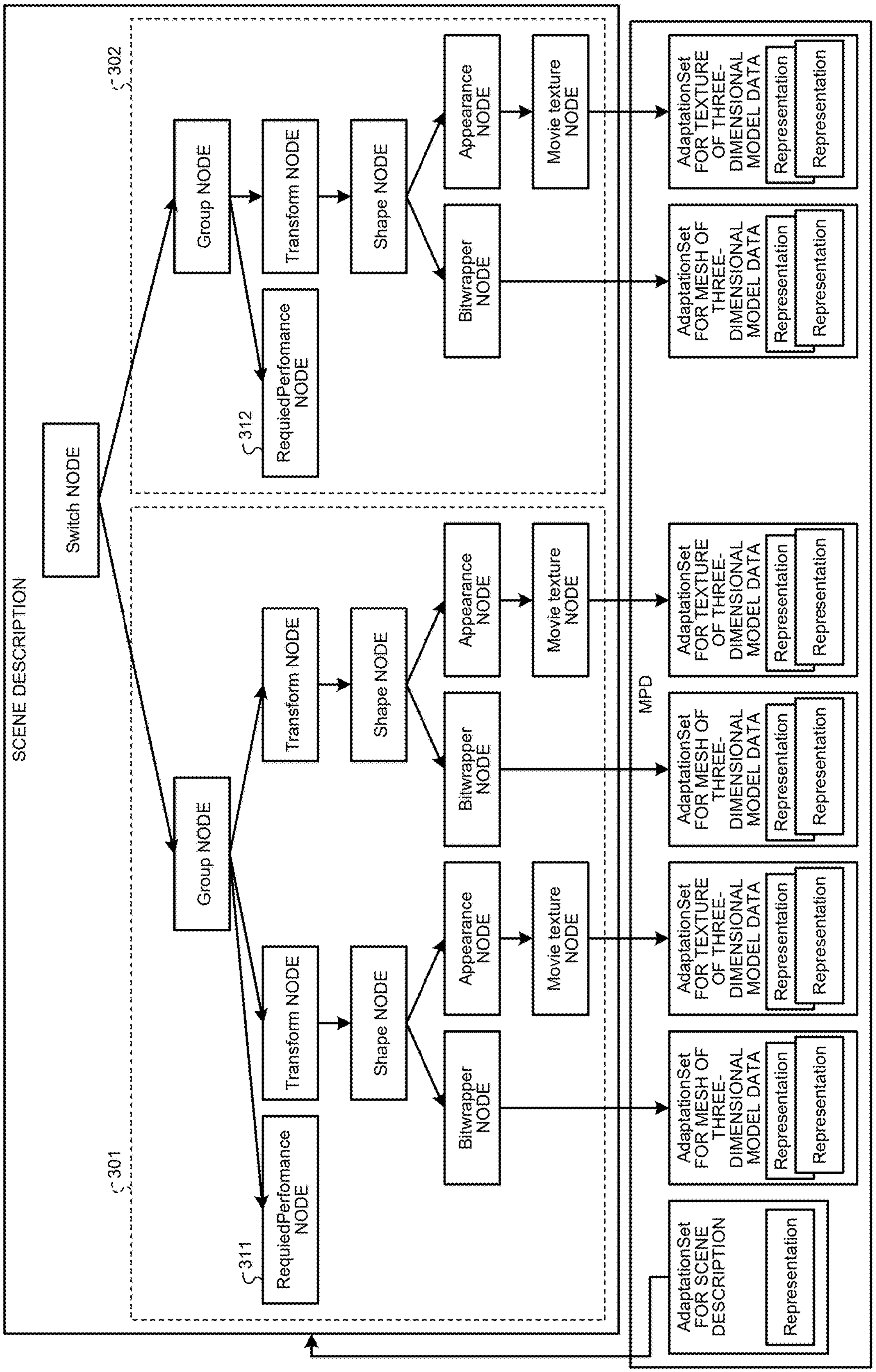
FIG. 13 is a diagram for describing a method of storing content configuration selection information according to Modification (4) of the first embodiment.

A file generation device 1 according to the present embodiment is different from that according to the first embodiment in that content configuration selection information is stored for scene description of each content configuration. FIG. 13 is a diagram for describing a method of storing content configuration selection information according to Modification (4) of the first embodiment.

For example, as illustrated in FIG. 4, a file generation unit 104 of the file generation device 1 according to the present modification newly defines a RequiedPerformance node 311 under a group node for a content configuration 301, and newly defines a RequiedPerformance node 312 under a group node for a content configuration 302. Then, the file generation unit 104 stores content configuration selection information in the RequiedPerformance node 311 for the content configuration 301. Also, the file generation unit 104 stores content configuration selection information in the RequiedPerformance node 312 for the content configuration 302.

FIG. 14 is a diagram illustrating an example of syntax for the RequiedPerformance node. Specifically, the file generation unit 104 defines a RequiedPerformance node as a node having content configuration selection information for one content configuration using the syntax illustrated in FIG. 14. As illustrated in FIG. 14, information serving as indexes for determining whether or not the content configuration is capable of reproduction is registered in the RequiedPerformance node. In this case, Points also represents the number of points of a point cloud. VertivesParFace represents the number of vertices of a face of a mesh. Faces represents the number of faces of a mesh. Indices represents the number of vertices of a mesh. Num3DmodelData represents the number of externally referred-to three-dimensional model data. 3DmodelDataMimeType represents a MimeType of externally referred-to three-dimensional model data. 3DmodelDataCodec represents a codec of externally referred-to three-dimensional model data. Bitrate represents a bit rate including externally referred-to three-dimensional model data.

A file processing unit 203 of a client device 2 according to the present modification acquires a RequiedPerformance node for each content configuration. At this stage, the file processing unit 203 does not acquire another child node under this group node. Next, the file processing unit 203 acquires content configuration selection information for each content configuration from each RequiedPerformance node. Then, the file processing unit 203 selects a content configuration. Thereafter, the file processing unit 203 acquires and parses the group node and its subsequent nodes of the selected content configuration.

As described above, the client device according to the present modification can select a content configuration by acquiring and analyzing up to the RequiedPerformance node immediately under the group node for each content configuration. Therefore, the processing can be reduced as compared with that in a case where the entire scene description is analyzed. In addition, the content configuration selection information can be provided to the client device without changing the existing node.

Here, in the present modification, a node storing the content configuration selection information is generated as a child node of the group node, but it may be a child node of another node as long as the another node is a root node for the content configuration. Furthermore, although container configuration selection information is generated for each container configuration in the present modification, the present modification is not limited thereto, and for example, the RequiedPerformance node may be configured to retain the RequiedPerformanceID of Modification (2).

1.5 Modification (5) of First Embodiment

A file generation device 1 according to the present modification is different from that according to the first embodiment in that content configuration selection information is stored in an AdaptationSet of an MPD file indicating information about access to scene description.

A preprocessing unit 102 of the file generation device 1 according to the present modification generates content configuration selection information. Then, the preprocessing unit 102 transmits metadata including the content configuration selection information to a file generation unit 104.

The file generation unit 104 receives inputs of the bit stream and the scene description from the encoding unit 103. The file generation unit 104 also receives an input of the metadata including the content configuration selection information from the preprocessing unit 102.

Then, the file generation unit 104 stores the acquired bit stream in an ISOBMFF file for each segment to be converted into a file, thereby generating a segment file for the bit stream. The file generation unit 104 also stores data about the scene description in an ISOBMFF file for each segment to be converted into a file, thereby generating a segment file for the scene description.

Further, the file generation unit 104 generates an MPD file on the basis of the data acquired from the preprocessing unit 102. At this time, the file generation unit 104 acquires the content configuration selection information included in the metadata. Then, the file generation unit 104 defines a 6DoFContentStruct descriptor illustrated in FIG. 15 in an AdaptationSet 320 of the MPD file for scene description as illustrated in FIG. 4. FIG. 15 is a diagram illustrating an example of describing 6DoFContentStruct Descriptor. Further, in accordance with the acquired content configuration selection information, the file generation unit 104 stores a CSC element for each content configuration in the 6DoFContentStruct Descriptor, and registers the content configuration selection information as an attribute of the CSC element.

FIG. 16 is a diagram illustrating semantics for CSC in Modification (5) of the first embodiment. As illustrated in FIG. 16, the CSC describes a definition of an information element indicating a capability of a content configuration. The CSC includes one or more elements up to 255 elements. Here, @Use indicates attribute information as to whether each element to be used is optional or mandatory.

In a case where a plurality of CSC elements appear, the CSC elements are registered in a content configuration order described in the choice field of the switch node of the scene description. In this case, csc@points represents the number of points of a point cloud. CSC@VertivesParFace represents the number of vertices of a face of a mesh. CSC@Faces represents the number of faces of a mesh. CSC@Indices represents the number of vertices of a mesh. CSC@Num3DmodelData represents the number of externally referred-to three-dimensional model data. CSC@3DmodelDataMimeType represents a MimeType of externally referred-to three-dimensional model data. CSC@3DmodelDataCodec represents a codec of externally referred-to three-dimensional model data. CSC@Bitrate represents a bit rate including externally referred-to three-dimensional model data.

A file processing unit 203 of a client device 2 according to the present embodiment acquires the content configuration selection information by parsing the MPD file. That is, the file processing unit 203 can acquire the content configuration selection information at the time of acquiring the MPD file, and can determine whether or not there is reproducible content in the scene description.

As described above, the client device according to the present embodiment can select a content configuration capable of reproduction without acquiring the scene description. Accordingly, it is possible to efficiently select a content configuration. However, in this case, since the content configuration selection information is stored in the MPD file, it can be said to be valid in a case where the reproduction processing capability required for reproducing the content configuration does not change every time period. Furthermore, although container configuration selection information is generated for each container configuration in the present modification, the present modification is not limited thereto, and for example, the attribute of the CSC element may be configured to store information indicating RequiedPerformanceID as in Modification (2).

2. Second Embodiment

A file generation device 1 according to the present embodiment is different from that according to the first embodiment in that a scene description for each content configuration is configured in a separate file, and content configuration selection information is stored in an AdaptationSet for each scene description. The file generation device 1 according to the present embodiment is illustrated in the block diagram of FIG. 3 as well. A client device 2 according to the present embodiment is illustrated in the block diagram of FIG. 6 as well. In the following description, description of operation of each unit that is identical to that in the first embodiment may be omitted.

Figure 17:
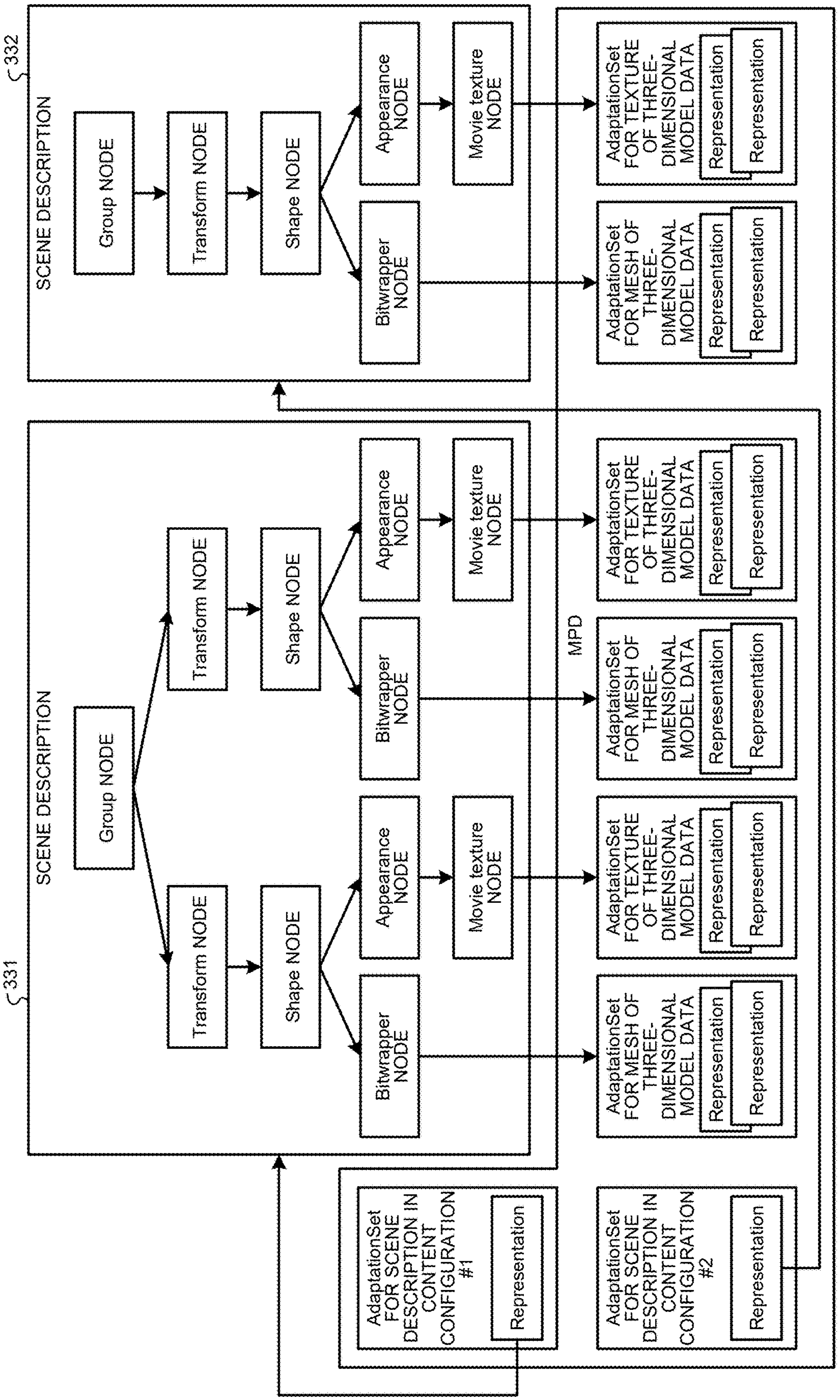
FIG. 17 is a diagram for describing a method of storing content configuration selection information according to a second embodiment.

FIG. 17 is a diagram for describing a method of storing content configuration selection information according to the second embodiment. A preprocessing unit 102 of the file generation device 1 according to the present modification generates scene descriptions 331 and 332 for respective content configurations as illustrated in FIG. 17. The scene description 331 is a scene description for content configuration #1. In addition, the scene description 332 is a scene description for content configuration #2. Then, the preprocessing unit 102 generates content configuration selection information for each of the content configurations #1 and #2, and outputs the generated content configuration selection information to a file generation unit 104.

The file generation unit 104 acquires the scene descriptions 331 and 332 from an encoding unit 103. In addition, the file generation unit 104 acquires the content configuration selection information for each of the content configurations #1 and #2 from the preprocessing unit 102.

Then, the file generation unit 104 stores the scene descriptions 331 and 332 in ISOBMFF files. In addition, the file generation unit 104 stores information for each content configuration in an AdaptationSet of an MPD file for each of the scene descriptions 331 and 332 using 6DoFContentStruct Descriptor illustrated in FIG. 15.

A file processing unit 203 of a client device 2 according to the present embodiment acquires the MPD file from a file acquisition unit 201. Then, the file processing unit 203 acquires the content configuration selection information included in each AdaptationSet of the MPD file for each of the scene descriptions 331 and 332. Then, the file processing unit 203 selects a content configuration to be used by using the acquired content configuration selection information. Thereafter, the file processing unit 203 acquires the scene description of the selected content configuration from a Web server 3 via the file acquisition unit 201.

As described above, the client device according to the present embodiment can select a content configuration at the time of acquiring the MPD file. Meanwhile, in the schemes according to the first embodiment and the modifications thereof, since a scene description including a content configuration that is not to be used is acquired, data that is not to be used is acquired. In this way, since the client device according to the present embodiment does not need to acquire data about a scene description for an unnecessary content configuration, the client device according to the present embodiment can efficiently select a content configuration as compared with those according to the first embodiment and the modifications thereof. However, in this case, since the content configuration selection information is stored in the MPD file, it can be said to be valid in a case where the reproduction processing capability required for reproducing the content configuration does not change every time period.

2.1 Modification (1) of Second Embodiment

A file generation device 1 according to the present modification is different from that according to the second embodiment in that content configuration selection information is stored in SampleEntry of an ISOBMFF file for scene description.

A preprocessing unit 102 of the file generation device 1 according to the present modification generates content configuration selection information. Then, the preprocessing unit 102 transmits metadata including the content configuration selection information to a file generation unit 104.

The file generation unit 104 receives inputs of the bit stream and the scene description from the encoding unit 103. In addition, the file generation unit 104 receives an input of the metadata including the content configuration selection information from the preprocessing unit 102.

Then, the file generation unit 104 stores the acquired bit stream in an ISOBMFF file for each segment to be converted into a file, thereby generating a segment file for the bit stream. The file generation unit 104 also stores data about the scene description in an ISOBMFF file for each segment to be converted into a file, thereby generating a segment file for the scene description.

When the scene description is stored in the ISOBMFF file, the file generation unit 104 stores the content configuration selection information included in the metadata in the SampleEntry of the ISOBMFF file for scene description. In this case, the file generation unit 104 can store the content configuration selection information according to the storage method illustrated in FIGS. 9 and 10.

A file processing unit 203 of a client device 2 according to the present embodiment acquires the ISOBMFF file for scene description from a file acquisition unit 201. Next, the file processing unit 203 acquires Initialization Segment of the acquired ISOBMFF file for scene description. Then, the file processing unit 203 acquires the content configuration selection information from 6DoFContentStructBox included in the Initialization Segment of the ISOBMFF file for scene description. Then, the file processing unit 203 selects a content configuration to be used by using the acquired content configuration selection information. Thereafter, the file processing unit 203 acquires the scene description of the selected content configuration from a Web server 3 via the file acquisition unit 201.

As described above, the client device according to the present embodiment acquires the content configuration selection information from the 6DoFContentStructBox included in the Initialization Segment of the ISOBMFF file for scene description. Thereafter, the client device only needs to acquire data for a scene description of a content configuration that is to be used, and does not need to acquire data for a scene description of the other content configuration that is not to be used. Therefore, it is possible to efficiently select a content configuration.

Here, as a file format at the time of transmitting three-dimensional model data, Matroska Media Container can be used instead of ISOBMFF. When the Matroska Media Container is used, the file generation unit 104 can store the content configuration selection information and provide the content configuration selection information to the client device in the same manner as in Modification (3) of the first embodiment.

3. Third Embodiment

In distribution of 6DoF content, a maximum processing capability, a bit rate, a definition, and the like can be changed by adaptation. Then, the reproduction processing capability required of the client changes due to the adaptation in bit rate or the like for each three-dimensional model data in one content configuration. For example, when a stream having the largest variation in the number of faces of a mesh as three-dimensional model data in a certain content configuration is selected, the client is required to have a high reproduction processing capability, but when a stream having the smallest variation in the number of faces of a mesh as three-dimensional model data in a certain content configuration is selected, the reproduction processing capability required of the client can be reduced.

That is, a content creator can increase the number of clients capable of reproduction by providing the content adapted in the content configuration. However, information for the client to determine whether the content adapted in the content configuration can be reproduced by the client is not provided. Therefore, a system enabling a client to efficiently select a content configuration in a case where there is adaptation in the content configuration will be described.

A file generation device 1 according to the present embodiment is different from that according to the first embodiment in that, together with information indicating a maximum reproduction processing capability required for reproduction, information indicating a minimally required reproduction processing capability is generated and stored, and provided to a client device 2. The file generation device 1 according to the present embodiment is illustrated in the block diagram of FIG. 3 as well. A client device 2 according to the present embodiment is illustrated in the block diagram of FIG. 6 as well. In the following description, description of operation of each unit that is identical to that in the first embodiment may be omitted.

A preprocessing unit 102 of the file generation device 1 according to the present embodiment generates content configuration selection information for each content configuration. Next, the preprocessing unit 102 extends a switch node of the scene description as illustrated in FIG. 18 to store the content configuration selection information for each content configuration.

FIG. 18 is a diagram illustrating an example of syntax for the extended switch node in the second embodiment. MaxPoints is a maximum number of points of a point cloud. MinPoints is a minimum number of points of a point cloud. MaxVertivesParFace is a maximum number of vertices of a face of a mesh. MinVertivesParFace is a minimum number of vertices of a face of a mesh. MaxFaces is a maximum number of faces of a mesh. MinFaces is a minimum number of faces of a mesh. MaxIndices is a maximum number of vertices of a mesh. MinIndices is a minimum number of vertices of a mesh. MaxNum3DmodelData is a maximum number of externally referred-to three-dimensional model data. MinNum3DmodelData is a minimum number of externally referred-to three-dimensional model data. Max3DmodelDataCodec is a maximum value of a codec of externally referred-to three-dimensional model data. Min3DmodelDataCodec is a minimum value of a codec of externally referred-to three-dimensional model data. MaxBitrate is a maximum bit rate including externally referred-to three-dimensional model data. MinBitrate is a minimum bit rate including externally referred-to three-dimensional model data.

Here, content configuration information indicating a maximum value is information indicating a reproduction processing capability with which the content can be reliably reproduced. In addition, content configuration information indicating a minimum value is information indicating a reproduction processing capability with which the content can be reproduced when adaptation is executed, and can be said to be information indicating a reproduction processing capability with which a part of the content can be reproduced.

The preprocessing unit 102 outputs a scene graph including the switch node represented by syntax illustrated in FIG. 18 to an encoding unit 103.

A file processing unit 203 of the client device 2 according to the present embodiment acquires the switch node from the acquired scene description. Then, the file processing unit 203 acquires system configuration selection information for each system configuration from the switch node. Then, the file processing unit 203 selects a system configuration to be used by using the acquired system configuration selection information. In this case, even if the client device 2 does not satisfy a reproduction processing capability required based on content configuration selection information indicating a maximum value in a certain system configuration, the file processing unit 203 can select the content configuration as long as a reproduction processing capability required based on content configuration selection information indicating a minimum value is satisfied.

Thereafter, the file processing unit 203 parses a group node and subsequent nodes of the selected system configuration for scene description.

In the first embodiment, since a maximum reproduction processing capability is required for a content configuration regardless of adaptation, a content configuration capable of reproduction if adaptation is performed therein is also not selected. In contrast, the client device according to the present embodiment can select a content configuration in which reproduction is available when adaptation is performed for reproduction, even though it is difficult to perform reproduction in the selected content configuration when the highest reproduction processing capability is required.

Accordingly, the content creator can also consider adaptation in a content configuration, so that 6DoF content can be distributed to correspond to client devices having different reproduction capabilities for reproduction. That is, the content creator can increase the number of client devices capable of reproduction with respect to one content configuration. In addition, the client device can consider adaptation in the content configuration to select a content configuration capable of reproduction according to its own reproduction processing capability.

3.1 Modification (1) of Third Embodiment

A file generation device 1 according to the present modification is different from that according to the third embodiment in that content configuration selection information is stored in SampleEntry of an ISOBMFF file for scene description.

A file generation unit 104 receives an input of the content configuration selection information from a preprocessing unit 102. The file generation unit 104 newly adds 6DoFContentStructBox to the SampleEntry of the ISOBMFF file for scene description. Then, the file generation unit 104 stores content configuration selection information indicated by syntax illustrated in FIG. 19 in the 6DoFContentStructBox. FIG. 19 is a diagram illustrating an example of the syntax for the content configuration selection information stored in the SampleEntry in Modification (1) of the third embodiment.

Thereafter, the file generation unit 104 outputs the ISOBMFF file for scene description including file configuration information to a transmission unit 105.

A file processing unit 203 of a client device 2 according to the present modification receives an input of the ISOBMFF file for scene description from a file acquisition unit 201. Then, Initialization Segment of the ISOBMFF file for scene description is acquired. Next, the file processing unit 203 acquires the content configuration selection information from the 6DoFContentStructBox in the acquired Initialization Segment. Then, the file processing unit 203 selects a content configuration to be used from the scene description using the acquired content configuration selection information. In this case, even if the client device 2 does not satisfy a reproduction processing capability required based on content configuration selection information indicating a maximum value in a certain system configuration, the file processing unit 203 can select the content configuration as long as a reproduction processing capability required based on content configuration selection information indicating a minimum value is satisfied.

As described above, in the scheme in which the content configuration selection information is stored in the SampleEntry of the ISOBMFF file for scene description, the client device can also select a content configuration in which reproduction is available when adaptation is performed for reproduction. Accordingly, the content creator can also consider adaptation in a content configuration, so that 6DoF content can be distributed to correspond to client devices having different reproduction capabilities for reproduction.

3.2 Modification (2) of Third Embodiment

A file generation device 1 according to the present modification is different from that according to the second embodiment in that content configuration selection information is stored in an AdaptationSet of an MPD file indicating information about access to scene description.

A preprocessing unit 102 of the file generation device 1 according to the present modification generates content configuration selection information. Then, the preprocessing unit 102 transmits metadata including the content configuration selection information to a file generation unit 104.

The file generation unit 104 receives inputs of the bit stream and the scene description from the encoding unit 103. The file generation unit 104 also receives an input of the metadata including the content configuration selection information from the preprocessing unit 102.

Then, the file generation unit 104 stores the acquired bit stream in an ISOBMFF file for each segment to be converted into a file, thereby generating a segment file for the bit stream. The file generation unit 104 also stores data about the scene description in an ISOBMFF file for each segment to be converted into a file, thereby generating a segment file for the scene description.

Further, the file generation unit 104 generates an MPD file on the basis of the data acquired from the preprocessing unit 102. At this time, the file generation unit 104 defines a 6DoFContentStruct descriptor, as illustrated in FIG. 20, in an AdaptationSet for scene description of the MPD file. Then, in accordance with the content configuration selection information, the file generation unit 104 stores a CSC element for each content configuration in the 6DoFContentStruct Descriptor, and registers the content configuration selection information as an attribute of the CSC element. FIG. 20 is a diagram illustrating semantics for CSC in Modification (2) of the third embodiment. As illustrated in FIG. 20, the CSC describes a definition of an information element indicating a capability of a content configuration.

Thereafter, the file generation unit 104 outputs the ISOBMFF file for scene description including file configuration information to a transmission unit 105.

A file processing unit 203 of a client device 2 according to the present embodiment acquires the content configuration selection information by parsing the MPD file. Then, the file processing unit 203 selects a content configuration to be used from the scene description using the acquired content configuration selection information. In this case, even if the client device 2 does not satisfy a reproduction processing capability required based on content configuration selection information indicating a maximum value in a certain system configuration, the file processing unit 203 can select the content configuration as long as a reproduction processing capability required based on content configuration selection information indicating a minimum value is satisfied.

As described above, in the scheme in which the content configuration selection information is stored in the AdaptationSet for scene description of the MPD file, the client device can also select a content configuration in which reproduction is available when adaptation is performed for reproduction. Accordingly, the content creator can also consider adaptation in a content configuration, so that 6DoF content can be distributed to correspond to client devices having different reproduction capabilities for reproduction.

Note that, although container configuration selection information is generated for each container configuration in the second embodiment and Modifications (1) and (2) thereof, they are not limited thereto, and for example, RequiedPerformanceID can be used to represent a maximum value and a minimum value.

4. Fourth Embodiment

A file generation device 1 according to the present embodiment is different from those according to the first to third embodiments in that each configuration information for three-dimensional model data is stored in a Representation included in an AdaptationSet for three-dimensional model data in MPD. The file generation device 1 according to the present embodiment is illustrated in the block diagram of FIG. 3 as well. A client device 2 according to the present embodiment is illustrated in the block diagram of FIG. 6 as well. In the following description, description of operation of each unit that is identical to that in the first embodiment may be omitted.

A file generation unit 104 of the file generation device 1 according to the present embodiment acquires content configuration selection information for each content configuration from a preprocessing unit 102. Then, when generating an MPD file, the file generation unit 104 stores the configuration information for three-dimensional model data in each Representation of the AdaptationSet for three-dimensional model data.

The file generation unit 104 stores, for example, the number of points, in the case of a point cloud, in a Representation@numPoint attribute as the configuration information for three-dimensional model data. In addition, the file generation unit 104 stores, in the case of a mesh, the number of vertices of a face in a Representation@vpf attribute, the number of faces in a Representation@numFase attribute, and the number of vertices in a Representation@numIndices attribute.

In the first to third embodiments and the respective examples thereof, by storing such configuration information, the file processing unit 203 of the client device 2 can select a content configuration capable of reproduction processing independently from the selection based on the content configuration selection information. Here, an example in which each configuration information for three-dimensional model data is stored in the Representation has been described. However, the file generation unit 104 may store the configuration information in another element such as AdaptationSet or Preselection.

Further, in addition to the storage of the configuration information, the file generation unit 104 may store a minimum value and a maximum value in the AdaptationSet for three-dimensional model data of the MPD.

For example, in the case of a point cloud, the file generation unit 104 stores a maximum value and a minimum value of the number of points in AdaptationSet @MaxNumPoint and AdaptationSet@MinNumPoint attributes, respectively. In addition, in the case of a mesh, the file generation unit 104 stores a maximum value and a minimum value of the number of vertices of a face in AdaptationSet@MaxVpf and AdaptationSet@MinVpf attributes, respectively, stores a maximum value and a minimum value of the number of faces in AdaptationSet@MaxNumFace and AdaptationSet@MinFace attributes, respectively, and stores a maximum value and a minimum value of the number of vertices AdaptationSet@MaxNumIndices and AdaptationSet@MinIndices attributes, respectively.

Figure 21:
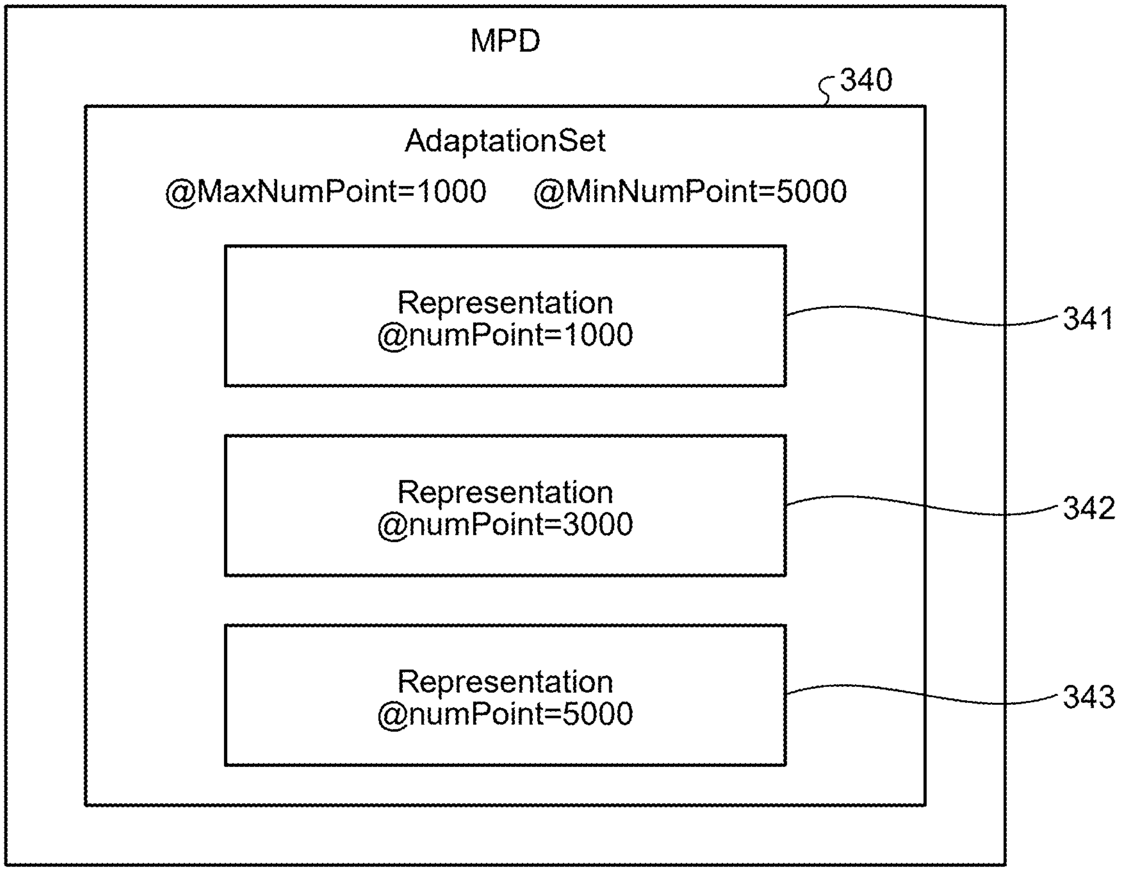
FIG. 21 is a diagram for describing a method of using configuration information stored in an AdaptationSet for three-dimensional model data.

The configuration according to the present embodiment can be used to determine a reproduction processing capability required for reproduction in a case where three-dimensional model data is transmitted using an MPD file without using a scene description. For example, a case where there is an AdaptationSet 340 for three-dimensional model data about a point cloud in an MPD file as in FIG. 21 will be described. FIG. 21 is a diagram for describing a method of using configuration information stored in an AdaptationSet for three-dimensional model data.

For example, as illustrated in FIG. 21, the file generation unit 104 stores information about a maximum value and a minimum value of the number of points in the AdaptationSet 340 for three-dimensional model data. Furthermore, the file generation unit 104 stores the numbers of points in Representations 341 to 343 included in the AdaptationSet 340.

When parsing the MPD file, a file processing unit 203 of a client device 2 can determine whether or not there is a Representation capable of reproduction processing at a level of the AdaptationSet 340. In a case where there is a Representation capable of reproduction processing, the file processing unit 203 can select the Representation capable of reproduction processing from among the Representations 341 to 343 for reproduction.

Alternatively, the file generation unit 104 may store the configuration information for three-dimensional model data in another place. For example, the file generation unit 104 newly defines 3DmModelDataMetadataBox in SampleEntry of an ISOBMFF file for three-dimensional model data. Then, in a case where the three-dimensional model data is a point cloud, the file generation unit 104 may store the number of points in the newly defined 3DmModelDataMetadataBox, and in a case where the three-dimensional model data is a mesh, the file generation unit 104 may store the number of vertices of a face, the number of faces, and the number of vertices in the newly defined 3DmModelDataMetadataBox.

In addition, the file generation unit 104 can use Matroska Media Container as a file format instead of ISOBMFF. In this case, the file generation unit 104 newly stores a 3DmodelDataMetadata element for the configuration information in a Track Entry element. At this time, the file generation unit 104 sets Element Type as binary. As EBML data, in a case where the D model data is a point cloud, the file generation unit 104 stores the number of points as binary data, and in a case where the D model data is a mesh, the file generation unit 104 stores the number of vertices of a face, the number of faces, and the number of vertices as binary data.

In each of the above-described embodiments and modifications thereof, it has been described that there are a plurality of content configurations, but the above-described embodiments and modifications thereof can also be applied in a case where it is determined whether or not one content configuration is a content configuration capable of reproduction processing. Further, even in a case where the client device does not have a reproduction processing capability with respect to 6DoF content having specific three-dimensional model data, the content configuration selection information can be used. For example, a content creator may distribute content in a configuration using one three-dimensional model data and a spherical video. In this case, by adding information indicating a spherical video, which is not three-dimensional model data, as the content configuration selection information, the client device can determine whether or not the content has a content configuration capable of reproduction using the content configuration selection information.

[Configuration of Hardware]

Figure 22:
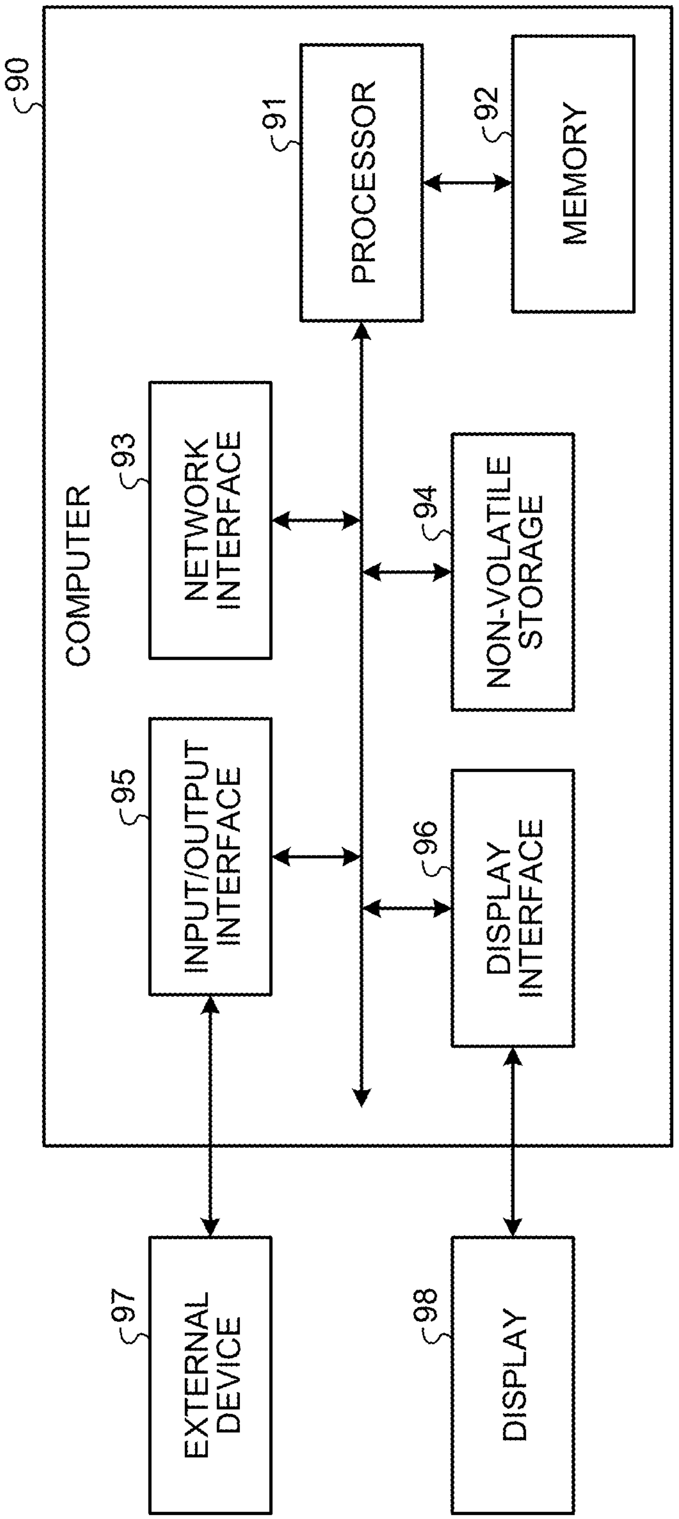
FIG. 22 is a hardware configuration diagram of a computer.

FIG. 22 is a hardware configuration diagram of a computer. The file generation device 1 and the client device 2 can be implemented by a computer 90 illustrated in FIG. 22. In the computer 90, a processor 91, a memory 92, a network interface 93, a non-volatile storage 94, an input/output interface 95, and a display interface 86 are connected to each other via a bus.

For example, external devices such as an input device, an output device, a storage device, and a drive are connected to the input/output interface 95. The input device is, for example, a keyboard, a mouse, a microphone, a touch panel, an input terminal, or the like. The output device is, for example, a speaker, an output terminal, or the like. The storage device is, for example, a hard disk, a random access memory (RAM) disk, or the like. The drive drives a removable medium such as a magnetic disk, an optical disk, a magneto-optical disk, or a semiconductor memory. In addition, a display 98, which is a display device, is connected to a display interface 96.

The network interface 93 is connected to an external network. The file generation device 1 and the client device 2 are connected to each other via the network interface 93. In addition, the file generation device 1 and the client device 2 are connected to the Web server 3 via the network interface 93. The non-volatile storage 94 is a built-in auxiliary storage device such as a hard disk or a solid state drive (SSD).

In the computer 90 configured as described above, the processor 91 loads a program stored, for example, in the non-volatile storage 94 into the memory 92 via the bus to execute the program, thereby performing the above-described series of processing. The memory 92 also appropriately stores data and the like required for the processor 91 to execute various types of processing.

The program executed by the processor 91 can be recorded in the removable medium, for example, as a package medium or the like for application. In this case, the program can be installed in the non-volatile storage 94 via the input/output interface 95 by mounting the removable medium on the drive, which is an external device 97.

Also, this program can be provided via a wired or wireless transmission medium such as a local area network, the Internet, or digital satellite broadcasting. In that case, the program can be received through the network interface 93 and installed in the non-volatile storage 94.

Alternatively, this program can be installed in the non-volatile storage 94 in advance.

Although the embodiments of the present disclosure have been described above, the technical scope of the present disclosure is not limited to the above-described embodiments, and various modifications can be made without departing from the gist of the present disclosure. In addition, the components of the different embodiments and modifications may be appropriately combined.

Note that the effects described in the present specification are merely examples and are not limited, and other effects may be provided.

Note that the present technology can also have the following configurations.

(1)

An information processing apparatus comprising:

a preprocessing unit that generates content configuration selection information, with respect to one or a plurality of contents, for determining whether or not each of the contents is reproducible, each of the contents having a content configuration including one or more three-dimensional objects and space arrangement information therefor to represent a virtual space; and a file generation unit that generates a file including data about the virtual space and the content configuration selection information.

(2)

The information processing apparatus according to (1), wherein the preprocessing unit sets the content configuration selection information to include availability identification information for determining whether or not decoding and rendering are executable entirely with respect to the virtual space in a reproduction processing apparatus reproducing the contents.

(3)

The information processing apparatus according to (1) or (2), wherein the preprocessing unit stores the content configuration selection information in a scene description.

(4)

The information processing apparatus according to (3), wherein the preprocessing unit stores the content configuration selection information in a switch node of the scene description.

(5)

The information processing apparatus according to (3), wherein the preprocessing unit stores the content configuration selection information for each content configuration in the scene description.

(6)

The information processing apparatus according to (2), wherein the preprocessing unit generates the content configuration selection information as metadata, and the file generation unit generates a content file storing the content configuration selection information.

(7)

The information processing apparatus according to (6), wherein the file generation unit generates the content file as an ISO base media file format (ISOBMFF) file, and stores the content configuration selection information in 6DoFContentStructBox of SampleEntry of the content file.

(8)

The information processing apparatus according to (2), wherein the preprocessing unit has the content configuration selection information for each group in which the content configuration is determined in advance, and sets the content configuration selection information of the group to which each of the contents belongs as the content configuration selection information of each of the contents.

(9)

The information processing apparatus according to (2), wherein the preprocessing unit generates the content configuration selection information as metadata, and the file generation unit generates a metadata file storing the content configuration selection information.

(10)

The information processing apparatus according to (9), wherein the file generation unit generates the metadata file as a media presentation description (MPD) file, and stores the content configuration selection information in AdaptationSet of the MPD file.

(11)

The information processing apparatus according to (2), wherein with respect to the plurality of contents having different content configurations, the preprocessing unit generates different scene descriptions for the respective content configurations, and the file generation unit stores the content configuration selection information in AdaptationSet of an MPD file or 6DoFContentStructBox of SampleEntry of an ISOBMFF file for each of the scene descriptions.

(12)

The information processing apparatus according to any one of (1) to (11), wherein the preprocessing unit sets information indicating a reproduction processing capability with which the content is reproducible as the content configuration selection information.

(13)

The information processing apparatus according to (12), wherein the preprocessing unit sets the content configuration selection information to include information indicating a reproduction processing capability with which a part of the content is reproducible.

(14)

An information processing method for causing a computer to execute:

generating content configuration selection information, with respect to one or a plurality of contents, for determining whether or not each of the contents is reproducible, each of the contents having a content configuration including one or more three-dimensional objects and space arrangement information therefor to represent a virtual space; and generating a file including data about the virtual space and the content configuration selection information.

(15)

A reproduction processing apparatus comprising:

a file acquisition unit that acquires a file including content configuration selection information, with respect to one or a plurality of contents, for determining whether or not each of the contents is reproducible, and data about the contents, each of the contents having a content configuration including one or more three-dimensional objects and space arrangement information therefor to represent a virtual space;

a file processing unit that acquires the content configuration selection information from the file acquired by the file acquisition unit, determines whether or not each of the contents is reproducible on the basis of the acquired content configuration selection information, and selects the content to be reproduced; and a reproduction unit that reproduces the content selected by the file processing unit.

(16)

A reproduction processing method for causing a computer to execute:

acquiring a file including content configuration selection information, with respect to one or a plurality of contents, for determining whether or not each of the contents is reproducible, each of the contents having a content configuration including one or more three-dimensional objects and space arrangement information therefor to represent a virtual space;

acquiring the content configuration selection information from the acquired file, determining whether or not each of the contents is reproducible on the basis of the acquired content configuration selection information, and selecting the content to be reproduced;

acquiring data about the selected content; and reproducing the selected content using the acquired data.

REFERENCE SIGNS LIST

1 FILE GENERATION DEVICE
2 CLIENT DEVICE
3 WEB SERVER
4 NETWORK
10 GENERATION PROCESSING UNIT
11 CONTROL UNIT
20 REPRODUCTION PROCESSING UNIT
21 CONTROL UNIT
101 DATA INPUT UNIT
102 PREPROCESSING UNIT
103 ENCODING UNIT
104 FILE GENERATION UNIT
105 TRANSMISSION UNIT
201 FILE ACQUISITION UNIT
202 MEASUREMENT UNIT
203 FILE PROCESSING UNIT
204 DECODING PROCESSING UNIT
205 DISPLAY CONTROL UNIT
206 DISPLAY INFORMATION GENERATION UNIT
207 DISPLAY UNIT

The invention claimed is:

1. An information processing apparatus comprising: processing circuitry configured to generate content configuration selection information from content, wherein the content includes one or more three-dimensional objects and space arrangement information of the one or more three-dimensional objects, and the content configuration selection information is used for selecting a content configuration capable of reproduction processing;

generate a file including the content and the content configuration selection information; and set the content configuration selection information to include availability identification information for determining whether or not decoding and rendering are executable with respect to the content.

2. The information processing apparatus according to claim 1, wherein the processing circuitry is further configured to store the content configuration selection information in a scene description.

3. The information processing apparatus according to claim 2, wherein the processing circuitry stores the content configuration selection information for each content configuration in the scene description.

4. The information processing apparatus according to claim 1, wherein processing circuitry is further configured to generate the content configuration selection information as metadata, and generate a content file which stores the content configuration selection information.

5. The information processing apparatus according to claim 4, wherein the processing circuitry generates the content file as an ISO base media file format ISOBMFF file, and stores the content configuration selection information in 6DoFContentStructBox of SampleEntry of the content file.

6. The information processing apparatus according to claim 1, wherein the processing circuitry has the content configuration selection information for each group in which the content configuration is determined in advance, and is configured to set the content configuration selection information of the group to which each of the content belongs as the content configuration selection information of each of the content.

7. The information processing apparatus according to claim 1, wherein the processing circuitry is further configured to generate the content configuration selection information as metadata, and generate a metadata file storing the content configuration selection information.

8. The information processing apparatus according to claim 7, wherein the processing circuitry generates the metadata file as a media presentation description MPD file, and stores the content configuration selection information in AdaptationSet of the MPD file.

9. The information processing apparatus according to claim 1, wherein with respect to a plurality of contents having different content configurations, the processing circuitry generates different scene descriptions for the respective content configurations, and the processing circuitry stores the content configuration selection information in AdaptationSet of an MPD file or 6DoFContentStructBox of SampleEntry of an ISOBMFF file for each of the scene descriptions.

10. The information processing apparatus according to claim 1, wherein the processing circuitry sets information indicating a reproduction processing capability with which the content is reproducible as the content configuration selection information.

11. The information processing apparatus according to claim 10, wherein the processing circuitry sets the content configuration selection information to include information indicating a reproduction processing capability with which a part of the content is reproducible.

12. An information processing method, comprising:

generating content configuration selection information from content, wherein the content includes one or more three-dimensional objects and space arrangement information of the one or more three-dimensional objects, the content configuration selection information is used for selecting a content configuration capable of reproduction processing; and generating a file including the content and the content configuration selection information, wherein the content configuration selection information is set to include availability identification information for determining whether or not decoding and rendering are executable with respect to the content.

13. A reproduction processing apparatus comprising: processing circuitry configured to acquire a file including content and content configuration selection information generated from the content, wherein the content includes one or more three-dimensional objects and space arrangement information of the one or more three-dimensional objects, the content configuration selection information is used for selecting a content configuration capable of reproduction processing;

acquire the content configuration selection information from the acquired file, determine whether or not each of the content configuration is capable of reproduction processing on the basis of the acquired content configuration selection information, and select the content configuration capable of reproduction processing; and reproduce the content corresponding to the selected content configuration, wherein the content configuration selection information is set to include availability identification information for determining whether or not decoding and rendering are executable with respect to the content.

14. An reproduction processing method, comprising:

acquiring a file including content and content configuration selection information generated from the content, wherein the content includes one or more three-dimensional objects and space arrangement information of the one or more three-dimensional objects, the content configuration selection information is used for selecting a content configuration capable of reproduction processing;

acquiring the content configuration selection information from the acquired file, determining whether or not each of the content configuration is capable of reproduction processing on the basis of the acquired content configuration selection information, and selecting the content configuration capable of reproduction processing; and reproducing the content corresponding to the selected content configuration, wherein the content configuration selection information is set to include availability identification information for determining whether or not decoding and rendering are executable with respect to the content.

* * * * *